US011405350B2

(12) United States Patent
Yao et al.

(10) Patent No.: US 11,405,350 B2
(45) Date of Patent: *Aug. 2, 2022

(54) MULTI-MEDIA PROCESSING AND DISPLAYING METHOD, TERMINAL, AND COMPUTER STORAGE MEDIUM IN A SOCIAL NETWORKING APPLICATION BASED ON INTERACTION INFORMATION BY MULTIPLE USER ACCOUNTS

(71) Applicant: Tencent Technology (Shenzhen) Company Limited, Shenzhen (CN)

(72) Inventors: Xun Yao, Shenzhen (CN); Qianya Lin, Shenzhen (CN); Leteng Weng, Shenzhen (CN); Zheng Tang, Shenzhen (CN); Yangbin Huang, Shenzhen (CN); Shuyuan Li, Shenzhen (CN); Chuanyu Zhang, Shenzhen (CN); Hao Li, Shenzhen (CN); Jin Lin, Shenzhen (CN); Bin Zhang, Shenzhen (CN); Juan Du, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 130 days.

This patent is subject to a terminal disclaimer.

(21) Appl. No.: 16/435,035

(22) Filed: Jun. 7, 2019

(65) Prior Publication Data
US 2019/0297048 A1 Sep. 26, 2019

Related U.S. Application Data

(63) Continuation of application No. 15/629,585, filed on Jun. 21, 2017, now Pat. No. 10,361,991, which is a
(Continued)

(30) Foreign Application Priority Data

Mar. 19, 2015 (CN) .......................... 201510120952.1

(51) Int. Cl.
*G06F 15/16* (2006.01)
*H04L 51/52* (2022.01)
(Continued)

(52) U.S. Cl.
CPC .............. *H04L 51/52* (2022.05); *H04L 51/10* (2013.01); *H04L 65/1069* (2013.01);
(Continued)

(58) Field of Classification Search
CPC ....................................................... H04L 51/52
(Continued)

(56) References Cited

U.S. PATENT DOCUMENTS

2009/0070412 A1\* 3/2009 D'Angelo ............. H04L 67/306
709/203
2011/0130293 A1 6/2011 Kawashima
(Continued)

FOREIGN PATENT DOCUMENTS

CN 102298751 A 12/2011
CN 104079473 A 10/2014
(Continued)

OTHER PUBLICATIONS

Tencent Technology, ISRWO, PCT/CN2016/072500, Apr. 18, 2016, 9 pgs.
(Continued)

*Primary Examiner* — Hee Soo Kim
(74) *Attorney, Agent, or Firm* — Morgan, Lewis & Bockius LLP

(57) ABSTRACT

An information processing method is performed at a terminal that is communicatively connected to a remote server. The method includes logging into a first user account of a social application and pulling, from the remote server, information associated with a social group, which includes the first user account and multiple user accounts that are
(Continued)

direct contacts of the first user account including a second user account. First multi-media information is by the second user account and is selected. A third user account is not a direct contact of the first user account. Second multi-media information by the third user account is selected when it is interacted by the second user account and satisfies preset policies of the remote server. The first multi-media information and the second multi-media information are displayed in a same manner, together with the interaction information by the second user account on the second multi-media information.

20 Claims, 16 Drawing Sheets

Related U.S. Application Data continuation of application No. PCT/CN2016/072500, filed on Jan. 28, 2016.

(51) Int. Cl.
| | | |
|---|---|---|
| *H04L 67/01* | (2022.01) | |
| *H04L 67/50* | (2022.01) | |
| *H04L 65/1069* | (2022.01) | |
| *H04L 51/10* | (2022.01) | |
| *H04M 1/72439* | (2021.01) | |
| *H04L 67/55* | (2022.01) | |
| *H04L 67/306* | (2022.01) | |

(52) U.S. Cl.
CPC ............ *H04L 67/01* (2022.05); *H04L 67/535* (2022.05); *H04L 67/306* (2013.01); *H04L 67/55* (2022.05); *H04M 1/72439* (2021.01)

(58) Field of Classification Search
USPC ........................................................ 709/206
See application file for complete search history.

(56) References Cited

U.S. PATENT DOCUMENTS

| | | | | |
|---|---|---|---|---|
| 2011/0258050 | A1* | 10/2011 | Chan ................. | G06Q 30/0269 705/14.66 |
| 2011/0320250 | A1 | 12/2011 | Gemmell et al. | |
| 2012/0158499 | A1* | 6/2012 | Banadaki ........... | G06Q 30/0254 705/14.52 |
| 2012/0158501 | A1* | 6/2012 | Zhang ................ | G06Q 30/0255 705/14.53 |
| 2012/0203846 | A1* | 8/2012 | Hull ........................ | H04L 51/32 709/206 |
| 2013/0073979 | A1* | 3/2013 | Shepherd .............. | G06F 40/284 715/744 |
| 2013/0290449 | A1* | 10/2013 | Norby ................... | H04L 12/185 709/206 |
| 2013/0332523 | A1* | 12/2013 | Luu ...................... | G06F 16/9535 709/204 |
| 2014/0025760 | A1* | 1/2014 | Shore ...................... | H04L 51/32 709/206 |
| 2014/0075006 | A1 | 3/2014 | Cherian et al. | |
| 2014/0095308 | A1 | 4/2014 | Tsukamoto et al. | |
| 2014/0108562 | A1* | 4/2014 | Panzer .................... | H04L 51/32 709/206 |
| 2014/0114739 | A1 | 4/2014 | Islam | |
| 2015/0046515 | A1* | 2/2015 | Pei .......................... | H04L 67/36 709/203 |
| 2015/0304263 | A1* | 10/2015 | Pike ........................ | H04L 51/32 709/206 |
| 2015/0317287 | A1* | 11/2015 | Schacht .............. | H04L 67/1095 715/205 |
| 2016/0162953 | A1* | 6/2016 | Tang ................... | G06Q 30/0269 705/14.66 |
| 2016/0202879 | A1* | 7/2016 | Chen ..................... | H04L 65/403 715/753 |

FOREIGN PATENT DOCUMENTS

| | | |
|---|---|---|
| CN | 104113787 A | 10/2014 |
| CN | 104660495 A | 5/2015 |
| JP | 2007528030 A | 10/2007 |
| JP | 2014075006 A | 4/2014 |
| JP | 2015505109 A | 2/2015 |
| WO | WO 2005086969 A2 | 9/2005 |
| WO | WO 2013106467 A1 | 7/2013 |

OTHER PUBLICATIONS

Tencent Technology, IPRP, PCT/CN2016/072500, Sep. 19, 2017, 8 pgs.

\* cited by examiner

MULTI-MEDIA PROCESSING AND DISPLAYING METHOD, TERMINAL, AND COMPUTER STORAGE MEDIUM IN A SOCIAL NETWORKING APPLICATION BASED ON INTERACTION INFORMATION BY MULTIPLE USER ACCOUNTS

PRIORITY CLAIM AND RELATED APPLICATION

This application is a continuation application of U.S. patent application Ser. No. 15/629,585, which is now U.S. Pat. No. 10,361,991, entitled "INFORMATION PROCESSING METHOD, TERMINAL, AND COMPUTER STORAGE MEDIUM" filed on Jun. 21, 2017, which is a continuation application of PCT Patent Application No. PCT/CN2016/072500, entitled "INFORMATION PROCESSING METHOD, TERMINAL, AND COMPUTER STORAGE MEDIUM" filed on Jan. 28, 2016, which claims priority to Chinese Patent Application No. 2015101209521, entitled "INFORMATION PROCESSING METHOD, TERMINAL, AND COMPUTER STORAGE MEDIUM" filed on Mar. 19, 2015, all of which are incorporated by reference in their entirety.

FIELD OF THE TECHNOLOGY

The present disclosure relates to communications technologies, and in particular, to an information processing method, a terminal, and a computer storage medium.

BACKGROUND OF THE DISCLOSURE

In a process of implementing technical solutions of embodiments of the present invention, the inventor of the present disclosure finds that the existing technology has at least the following technical problems:

With development of Internet technologies, information explosions in the age of big data emerge one after another. Considering a requirement for diversified sharing of public information, some multi-media information may be shared on various terminal applications such as WeChat, Microblog, Video, and Game by means of the current information processing technology, to adapt to the requirement for diversified sharing. For example, in a segment of TV play video in which a video emerges as first multi-media information, second multi-media information, for example, a notebook computer of a new brand, related to the TV play video may be shared, so that a user obtains diversified information besides the video itself at a time.

Using social applications such as WeChat and Microblog as an example, a user may share related first multi-media information that is not reviewed, for example, a nice passage read by the user, or a product that the user uses and that the user wants to recommend to friends or more people. Predefined second multi-media information that is reviewed and designated may further be shared by means of the social applications.

However, problems existing in information sharing in the current information processing technology are:

1) Considering that information needs to be shared widely among the general public, all users can share the information. However, when the second multi-media information is shared to a user, due to inaccurate positioning, interference may be caused to the user. Consequently, a user interface is full of useless information, affecting normal use of functions by the user. In addition, although a background server pushes a large amount of second multi-media information, the information is less helpful to the user. The large amount of invalid multi-media information occupies network resource bandwidths during interaction between the background server and a foreground terminal. In addition, a success rate at which the foreground terminal obtains valid multi-media information is affected. Sometimes, the terminal obtains more than 50 pieces of multi-media information, but only several pieces are useful to the user. In this case, a large quantity of system resources of the foreground terminal are occupied and wasted.

2) Because the second multi-media information is shared to all users, the sharing is insufficiently timely, and attention and acceptance of people for the information are not high. Consequently, a large amount of useful information is drowned in vast feeds. Because the user misses the valuable information, has to manually search the vast feeds, and refreshes and browses the feeds, human costs are wasted. The screen is constantly on due to feeds refreshing and power consumption of the foreground terminal is wasted. Meanwhile, processing resources of the foreground terminal, for example, CPU or buffer, are occupied.

However, in related technologies, there is no effective solution to the foregoing problems.

SUMMARY

In view of this, embodiments of the present invention provide an information processing method, a terminal, and a computer storage medium, to resolve the foregoing problems in the existing technology.

Technical solutions of the embodiments of the present invention are implemented in this way:

An embodiment of the present invention provides an information processing method, applied to a terminal, and including:

logging into, by a first user account, the terminal, and pulling a social group including the first user account and at least one second user account, the second user account and the first user account belonging to the same social group; and receiving and displaying, in the social group by the first user account, second multi-media information propagated by a third user account, and/or propagated second multi-media information formed based on interaction of the at least one second user account in the social group for the second multi-media information; and directly displaying the second multi-media information on a user interface of the terminal in an external display manner, so that the first user account can directly view information about previous interaction of the at least one second user account for the second multi-media information, the second multi-media information being different from first multi-media information shared by any user in the social group, the second multi-media information being specified information that conforms to a preset policy on a server side and that is pushed, and the second multi-media information and the first multi-media information being displayed in a same mode.

An embodiment of the present invention provides a terminal, including a display unit, and further including:

a group pulling unit, configured to: log into, by a first user account, the terminal, and pull a social group including the first user account and at least one second user account, the second user account and the first user account belonging to the same social group; and a first receiving unit, configured to: receive and display, in the social group by the first user account, second multi-media information propagated by a third user account, and/or propagated second multi-media information formed based on interaction of the at least one second user account in the social group for the second multi-media information; and directly display the second multi-media information on a user interface of the terminal in an external display manner, so that the first user account can directly view information about previous interaction of the at least one second user account for the second multi-media information; and the display unit being configured to display the second multi-media information, the second multi-media information being different from first multi-media information shared by any user in the social group, the second multi-media information being specified information that conforms to a preset policy on a server side and that is pushed, and the second multi-media information and the first multi-media information being displayed in a same mode.

When executing the processing, the grouping pulling unit, the first receiving unit, and the display unit may be central processing units (CPU), digital signal processors (DSP), or field-programmable gate arrays (FPGA).

An embodiment of the present invention further provides a computer storage medium, storing a computer executable instruction, and the computer executable instruction being used for executing the information processing method.

The information processing method in the embodiments of the present invention includes: logging into, by a first user account, a terminal, sending a first request, and establishing a communications connection between the terminal and a server after the first request is authenticated; pulling, based on the communications connection, a social group including the first user account and at least one second user account, the second user account and the first user account belonging to the same social group; receiving and displaying, in the social group by the first user account, second multi-media information propagated by a third user account, and/or propagated second multi-media information formed based on interaction of the at least one second user account in the social group for the second multi-media information; and directly displaying the second multi-media information on a user interface of the terminal in an external display manner, so that the first user account can directly view information about previous interaction of the at least one second user account for the second multi-media information, and the interaction information being open only to the first user account and the at least one second user account in the social group, the second multi-media information being different from first multi-media information shared by any user in the social group, the second multi-media information being specified information that conforms to a preset policy on the server side and that is pushed, and the second multi-media information and the first multi-media information being displayed in a same mode.

By means of the embodiments of the present invention, based on the same social group that is pulled and to which the users belong, a mechanism that sharing is performed secretly in the social group is used. The first user account receives and displays, in the social group, the second multi-media information propagated by the third user account, and/or the propagated second multi-media information formed based on interaction of the at least one second user account in the social group for the second multi-media information. Feedback to the shared information in the social group is relatively critical, and it is different from a case in which feedback may be sent freely in a completely open public environment without restriction. Therefore, 1) in one aspect, subsequent feedback information is provided to the server and is used as a parameter control factor, to correct a policy to obtain second multi-media information, and the second multi-media information is pushed to the terminal more accurately due to sufficiently accurate analysis of feedback information; 2) in another aspect, information shared in the social group is based on the moments, for example, friends may follow similar types of valuable information; therefore, the propagated second multi-media information formed based on interaction of the at least one second user account in the social group for the second multi-media information may gain higher attention and reliability; in addition, the second multi-media information is directly displayed on the user interface of the terminal in an external display manner, so that the first user account can directly view the information about previous interaction of the at least one second user account for the second multi-media information, and the user can obtain the interaction information in time, to know in time whether the second multi-media information is valuable; in this case, a probability and an opportunity of obtaining, by the user, valuable information is greatly improved, and two problems in the existing technology are resolved. In addition, the second multi-media information is different from the first multi-media information shared by any user in the social group, the second multi-media information is specified information that conforms to the preset policy on the server side and that is pushed, and the second multi-media information and the first multi-media information are displayed in a same mode. In this case, a uniform user interface style may be formed, and no interference is caused to function use and display habits of the user.

DESCRIPTION OF EMBODIMENTS

The following further describes in detail implementation of the technical solutions with reference to the accompanying drawings.

Method Embodiment 1

Figure 1:
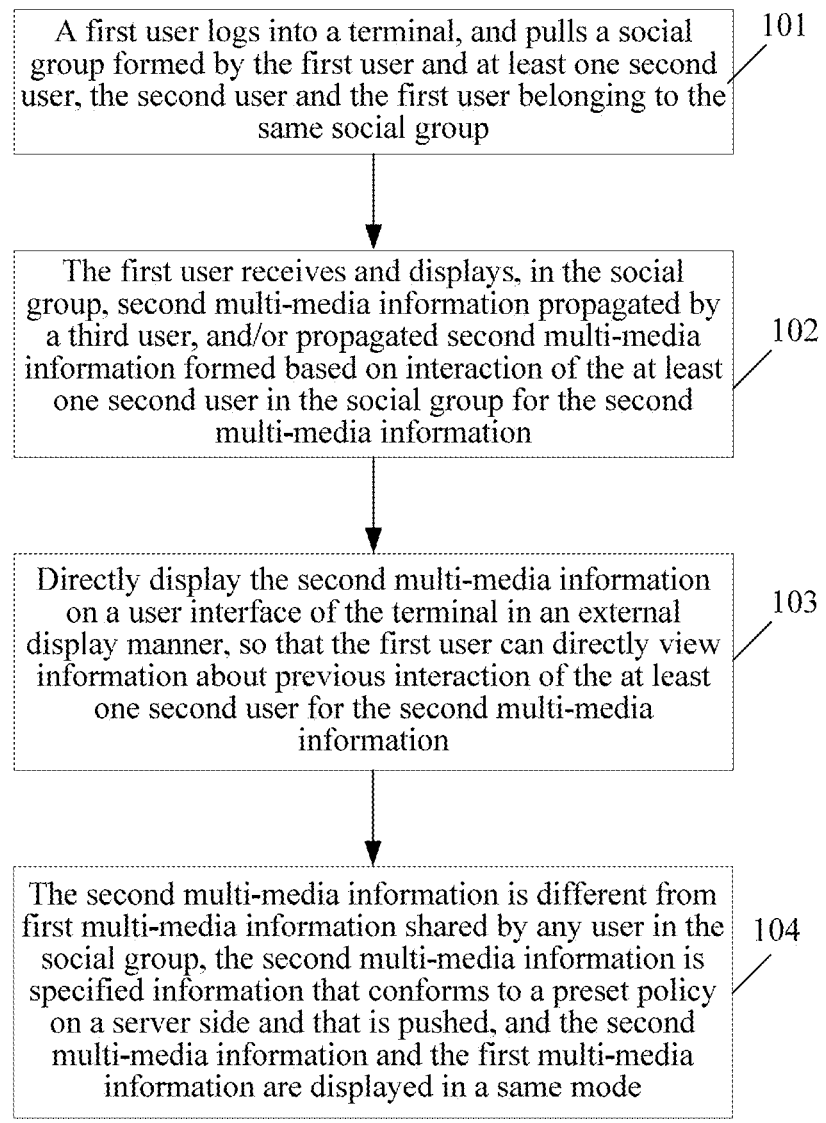
FIG. 1 is a schematic implementation flowchart according to method embodiment 1 of the present invention.

This embodiment of the present invention provides an information processing method. As shown in FIG. 1, the method is applied to a terminal, and the method includes the following steps:

Step 101: A first user account logs into the terminal, and pulls a social group including the first user account and at least one second user account, the second user account and the first user account belonging to the same social group.

The first user account logs into the terminal, may send a first request, and establishes a communications connection between the terminal and a server after the first request is authenticated. The first request may be a login request. If the first user account logs in successfully by using an account name and a password at the first time and does not exit the terminal, when the first user account uses the terminal subsequently, the first user account does not need to log in, and may directly establish interaction between the terminal and the server by using the established communications connection. In this case, this step may be omitted.

The social group refers to a friend circle formed by a friend link. The terminal pulls the social group at the background and displays the social group on a user interface of the terminal. For example, in WeChat, the social group may be a WeChat friend circle. There may be more than one WeChat friend circle, and multiple WeChat friend circles may be established according to user requirements, for example, based on similar habits, or based on college/classmate relationships, or based on technical fields of works.

The second user account refers to any one or more users in multiple friend circles of the user.

Step 102: The first user account receives and displays, in the social group, second multi-media information propagated by a third user account, and/or propagated second multi-media information formed based on interaction of the at least one second user account in the social group for the second multi-media information.

This step may be: sharing the second multi-media information based on sharing among the friend circle and/or based on interaction such as likes and/or comments of friends in the friend circle.

The third user account refers to an official account, which may be a personal account, or a collective account, for example, an advertiser such as Bayerische Motoren Werke. The third user account is a virtual friend. A manner of receiving and displaying, in the social group, second multi-media information propagated by the third user account is: The advertiser pushes, based on the official account, the second multi-media information that is reviewed by the server, and shares, as a virtual friend of the first user account, the second multi-media information in advertisement content recommendation in the moments. This is a direct recommendation manner.

A manner of forming propagated second multi-media information based on interaction of the at least one second user account in the social group for the second multi-media information is an advertisement content recommendation manner based on the moments and is a manner of indirectly obtaining advertisement content based on an interaction relationship between friends and the advertisement in the moments.

Step 103: Directly display the second multi-media information on a user interface of the terminal in an external display manner, so that the first user account can directly view information about previous interaction of the at least one second user account for the second multi-media information.

In this step, the second multi-media information and the interaction information are open only to the first user account and the at least one second user account in the social group. For example, the interaction information is likes and comments, and the likes and comments can be viewed only by people in the friend circle.

Step 104: The second multi-media information is different from first multi-media information shared by any user in the social group, the second multi-media information is specified information that conforms to a preset policy on the server side and that is pushed, and the second multi-media information and the first multi-media information are displayed in a same mode.

It should be noted that, the second multi-media information is not information pushed by any people not in the social group. For example, on some social platforms, for example, SINA Microblog, Su'ning appliance secretary may push some recommendation information to the user even if the Su'ning appliance secretary is not a friend in the social group (for example, the friend circle) of the user. The second multi-media information in this embodiment of the present invention is specified information that is reviewed by the background server, that conforms to the preset policy on the background server side, and that is pushed. Advantages are: Harassment information pushed by a user not in the friend circle is avoided, and the specified information that conforms to the preset policy on the background server side and that is pushed is a result obtained after behaviors of the users in the friend circle are recorded, collected, and analyzed. Therefore, the second multi-media information in this embodiment of the present invention can satisfy a requirement for accurate user positioning of information pushing and sharing.

In an implementation manner of this embodiment of the present invention, the interaction information includes first feedback information and/or second feedback information. The first feedback information (for example, likes) and the second feedback information (for example, mutual comments of users) are displayed in a first state, displaying is expanded without a user operation, and the first state is used for representing that the first user account and the at least one second user account in the social group can directly view feedback of each other.

In an implementation manner of this embodiment of the present invention, the first feedback information includes first feedback information formed when the first user account receives the second multi-media information, and the second feedback information includes second feedback information formed when the at least one second user account makes interaction for the second multi-media information.

The method further includes: reporting the first feedback information and the second feedback information, so that the server can analyze the first feedback information and the second feedback information and optimize a push policy of the second multi-media information. For example, feedback formed when the terminal collects likes and comments of the user is reported to the server, so that the server can optimize an advertisement pushing policy according to the feedback.

In an implementation manner of this embodiment of the present invention, the second multi-media information is displayed on the user interface of the terminal in at least one form of text, picture, video, or audio.

The method further includes:

a1: There is a first interaction object, for example, an icon "Promotion", when the second multi-media information is displayed.

a2: Receive a third user operation on the first interaction object.

a3: In response to the third user operation, display second prompt information (if this is advertisement promotion information, ask whether the user is interested), the second prompt information being used for prompting whether the first user account continues to follow information content of the second multi-media information.

a4: Receive a fourth user operation on the second prompt information, to obtain third feedback information for the second prompt information and report the third feedback information to the server. The third feedback information may be feedback on the "second prompt information (if this is advertisement promotion information, ask whether the user is interested)", for example, interested or not interested in the advertisement promotion information.

In an implementation manner of this embodiment of the present invention, the second multi-media information is displayed on the user interface of the terminal in at least one form of text, picture, video, or audio.

The method further includes:

b1: There is a second interaction object, for example, an icon "Check the details", when the second multi-media information is displayed.

b2: Receive a fifth user operation on the second interaction object.

b3: In response to the fifth user operation, enter a first information page.

b4: The first information page is used for displaying information content of the second multi-media information.

b5: Choose to follow the information content of the second multi-media information on the first information page, to establish association between the first user account and the third user account, or directly trigger entering an official account, to enter an information content page, provided by the third user account associated with the first user account, for the second multi-media information.

It should be noted that, for the preset policy on the background server side in step 105, the preset policy for pushing an advertisement includes the following content:

First, for related background pushing logic configured on the server in the preset policy, 1) when a user clicks "Not interested", no matter whether there are likes or comments for the advertisement, the advertisement disappears; 2) logic for viewing a message prompt after the advertisement disappears is similar to a disappearance processing mechanism in the local; if a message is prompted on a floating layer in the feeds, after the prompt is clicked, no item of the message can be clicked and it is controlled by the server; if the user enters a message prompt list via a personal page, the terminal may be responsible for executing the disappearance processing mechanism; 3) after the user clicks "Not interested", the same advertisement shall not be pushed to the user again; 4) advertisement content of a same advertiser may not be pushed to the user within two weeks; 5) a weight at which the user views an advertisement of this industry is decreased, and an increase or a decrease of the weight may be recorded by means of an operator; 6) if the user clicks "Not interested" for an advertisement of an advertiser twice, advertisements of the advertiser may not be pushed to the user subsequently; 7) if the user clicks "Not interested" for an advertisement of an industry twice, after the second click, advertisements of this industry may not be pushed to the user within one month.

Second, for how to filter a first round of users for preferential pushing in the preset policy, a seed user is selected. An advertisement may be pushed to a social node user (seed user) at the beginning. Two types of users conform to definition of the seed user: A. active user: logging into the WeChat more than eight times every day, sending more than 50 messages every day, and having more than 500 friends; B. opinion leader: each message in the moments receiving more than 30 likes, and giving more than 10 likes on average every day. These people are pre-defined as seed users, and the server may preferentially push advertisements to these users.

Third, for sequenced display of social shuffling that is performed, in the friend circle based on the relationship link, on advertisements displayed on the user interface of the terminal in the preset policy, a major feature of advertisements in the friend circle is social propagation. After a user makes interaction for the advertisement, when a friend of the user subsequently views the advertisement attached with interaction, the advertisement may have greater effect on the friend. Therefore, for the policy, if user A views an advertisement X, and likes or comments on the advertisement, a probability of viewing, by a friend of user A, the advertisement X subsequently is increased, and the advertisement A is more easily displayed to the friend of user A when competing with other advertisements. If user B enters the moments, and there are multiple advertisements that friends of user B like or comment on, a weight at which an advertisement having a largest quantity of likes and comments is displayed to user B is the largest.

Based on a design principle of sequenced display of social shuffling, the following mechanism may be used for implementation.

Social shuffling: When a user enters the moments, if an appearance condition of an advertisement is reached, assuming that there are three advertisements, and all three advertisements satisfy an orientation of user A, which advertisement is pushed to the user A is determined according to the following rules (assuming that the orientations are consistent): exposure weight=(a quantity of likes given by friends of the user to each advertisement*0.5+a quantity of the first comments given by the friends to the advertisement*0.35+a total like rate of the advertisement (a total quantity of likes/a total quantity of exposure people)*0.15)*a correction factor R. The correction factor R is defined as: If the friends give more than 50 comments to the advertisement, because there are too many likes and comments, and the exposure rate of the advertisement is too high, an appearance probability is decreased, and R=0.5. At another moment, R=1.

Fourth, for other logic in the preset policy, 1) for example, for an appearance opportunity of an advertisement, to limit a quantity of times of exposures of advertisements to a same user, it is set: When the user visits the moments, only when there are four or more than four pieces of new content, one advertisement is pushed; one advertisement is pushed to a user every 48 hours; a time interval may be adjusted flexibly; 2) for example, for an appearance position of an advertisement, when four or more than four pieces of new content are generated, an advertisement may appear in a position following the fourth content (content pushed by the user is not counted); once the advertisement is generated, the advertisement may not be always in the position of the fifth content; as new messages emerge, the advertisement gradually sinks (for example, there are five pieces of content at the beginning, and then, some friends push five pieces of content in the moments, and in this case, the advertisement is displayed in a position of the tenth content); 3) for example, for a disappearance policy, when a user views an advertisement, if the user likes or comments on the advertisement, the advertisement may stay in the moments of the user; if the user gives no like or comment to the advertisement within six hours, the advertisement may disappear from the moments of the user sixth hours after the user views the advertisement for the first time.

It should be noted that, the preset policies involved in the fourth article may be implemented on the server side, or on the terminal side. There are the following implementation manners.

Implementation manner 1: a specific implementation of an appearance opportunity of the second multi-media information (for example, advertisement information) is as follows:

The information processing method in this embodiment of the present invention further includes:

A1: Detect whether a first preset condition is satisfied, to obtain a detection result.

A2: The first preset condition is used for representing a trigger opportunity of actively pulling, by the first user account, the second multi-media information.

A3: If the detection result is that the first preset condition is satisfied when the second multi-media information received and displayed by the first user account in the social group is greater than or equal to a first threshold, the first user account actively pulls the second multi-media information.

The first threshold may be: four pieces of new content are received and displayed.

Implementation manner 2: another specific implementation of an appearance opportunity of the second multi-media information (for example, advertisement information) is as follows:

The information processing method in this embodiment of the present invention further includes:

B1: Detect whether a second preset condition is satisfied, to obtain a detection result.

B2: The second preset condition is used for representing a trigger opportunity of actively periodically pulling, by the first user account, the second multi-media information.

B3: If the detection result is that the second preset condition is satisfied when a time interval at which the first user account pulls the second multi-media information reaches a time interval specified in a second threshold, the first user account actively pulls the second multi-media information.

The time interval specified in the second threshold may be 48 hours.

Implementation manner 3: a specific implementation of an appearance position of the second multi-media information (for example, advertisement information) is as follows:

The information processing method in this embodiment of the present invention further includes:

C1: Detect whether a third preset condition is satisfied, to obtain a detection result.

C2: The third preset condition is a condition for setting an appearance position of the second multi-media information in feeds.

C3: If the detection result is that the third preset condition is satisfied when the appearance position of the second multi-media information in the feeds is greater than or equal to a first display position specified in a third threshold, display the second multi-media information in the first display position.

The first display position specified in the third threshold may be a position of the fifth content following the fourth new content.

In an implementation manner of this embodiment of the present invention, the method further includes: as new information is received and displayed in the social group, display, in a second display position, the second multi-media information displayed in the first display position, the second display position being greater than the first display position. For example, the second display position is a display position of the tenth content, and the first display position is a display position of the fifth content.

Implementation manner 4: a specific implementation of a disappearance policy of the second multi-media information (for example, advertisement information) is as follows:

The information processing method in this embodiment of the present invention further includes:

D1: Detect whether a fourth preset condition is satisfied, to obtain a detection result.

D2: The fourth preset condition is a condition for setting that the second multi-media information disappears from feeds.

D3: If the detection result is that the fourth preset condition is satisfied when no user in the social group feeds back to the second multi-media information within a time period specified in a fourth threshold, enable the second multi-media information to disappear from the feeds.

The time period specified in the fourth threshold may be 6 hours.

D4: A start time point of the time period specified in the fourth threshold is a time when the second multi-media information appears in the feeds and the first user account follows the second multi-media information at the first time.

In an implementation manner of this embodiment of the present invention, content of the second multi-media information is reviewed by the server and is customized by the third user account, and the third user account includes an individual user or a collective user that is registered in the server via an official account.

Method Embodiment 2

Figure 2:
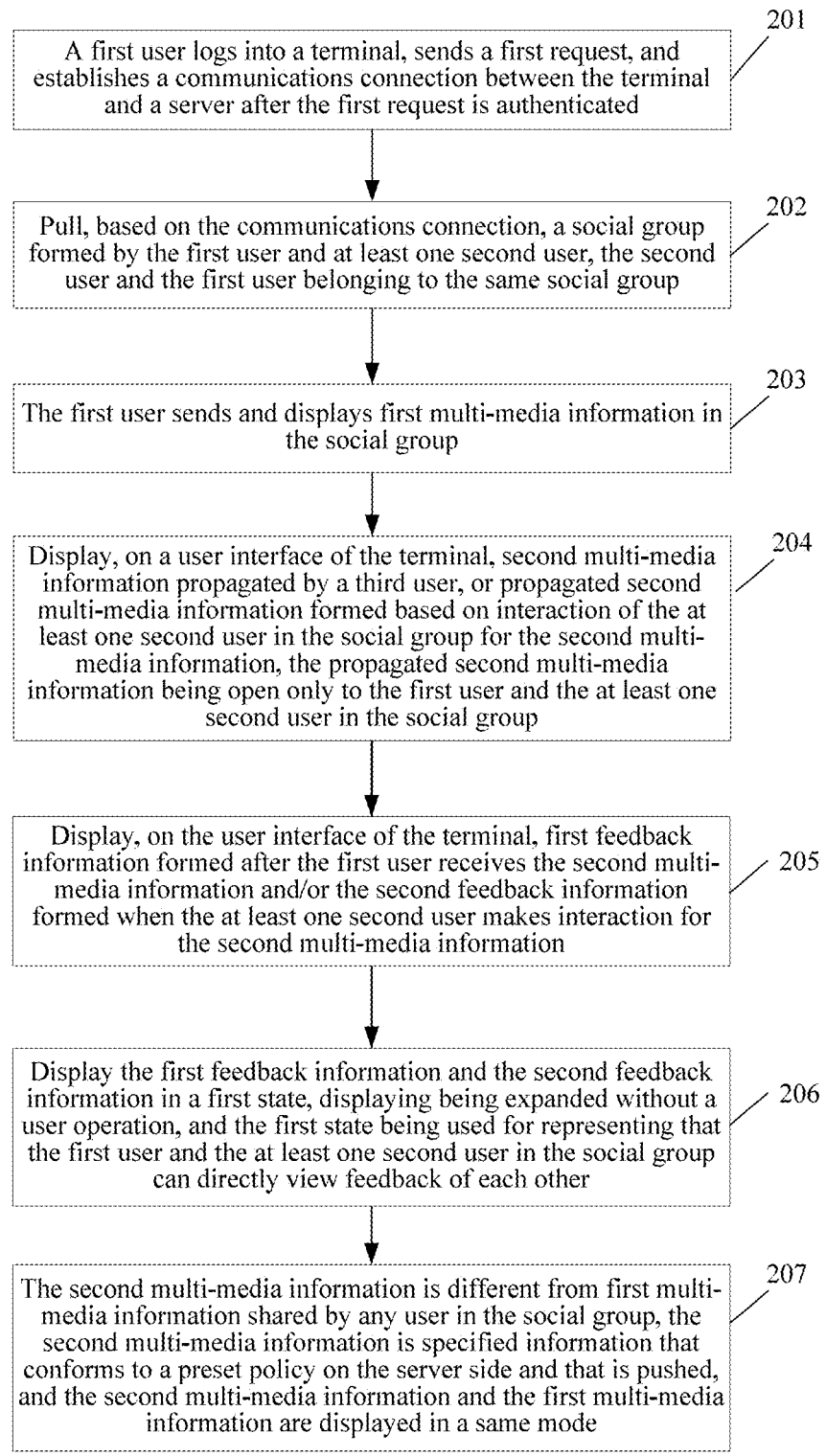
FIG. 2 is a schematic implementation flowchart according to method embodiment 2 of the present invention.

This embodiment of the present invention provides an information processing method. As shown in FIG. 2, the method is applied to a terminal, and the method includes the following steps:

Step 201: A first user account logs into the terminal, sends a first request, and establishes a communications connection between the terminal and the server after the first request is authenticated.

The first request may be a login request. If the first user account logs in successfully by using an account name and a password at the first time and does not exit the terminal, when the first user account uses the terminal subsequently, the first user account does not need to log in, and may directly establish interaction between the terminal and the server by using the established communications connection. In this case, this step may be omitted.

Step 202: Pull, based on the communications connection, a social group including the first user account and at least one second user account, the second user account and the first user account belonging to the same social group.

The social group refers to a friend circle formed by a friend link. The terminal pulls the social group at the background and displays the social group on a user interface of the terminal. For example, in WeChat, the social group may be a WeChat friend circle. There may be more than one WeChat friend circle, and multiple WeChat friend circles may be established according to user requirements, for example, based on similar habits, or based on college/classmate relationships, or based on technical fields of works.

The second user account refers to any one or more users in multiple friend circles of the user.

Step 203: The first user account sends and displays first multi-media information in the social group.

Step 203 is an optional step, and is not a necessary step. The first multi-media information is image-text information edited by the user, or may be a video, an audio such as recording, or the like. The information does not need to be reviewed by the server before being displayed on the user interface.

Step 204: Display, on the user interface of the terminal, second multi-media information propagated by a third user account, or propagated second multi-media information formed based on interaction of the at least one second user account in the social group for the second multi-media information, the propagated second multi-media information being open only to the first user account and the at least one second user account in the social group.

In an implementation manner of this embodiment of the present invention, the second multi-media information is directly displayed on a user interface of the terminal in an external display manner, so that the first user account can directly view information about previous interaction of the at least one second user account for the second multi-media information. The interaction information includes first feedback information and/or second feedback information in step 205.

The third user account refers to an official account, which may be a personal account, or a collective account, for example, an advertiser such as Bayerische Motoren Werke. The third user account is a virtual friend. A manner of receiving and displaying, in the social group, second multi-media information propagated by the third user account is: The advertiser pushes, based on the official account, the second multi-media information that is reviewed by the server, and shares, as a virtual friend of the first user account, the second multi-media information in advertisement content recommendation in the moments. This is a direct recommendation manner.

A manner of forming propagated second multi-media information based on interaction of the at least one second user account in the social group for the second multi-media information is an advertisement content recommendation manner based on the moments and is a manner of indirectly obtaining advertisement content based on an interaction relationship between friends and the advertisement in the moments.

Step 205: Display, on the user interface of the terminal, first feedback information formed after the first user account receives the second multi-media information and/or the second feedback information formed when the at least one second user account makes interaction for the second multi-media information.

For example, the first user account is user A, and the second user account is user B and user C. Likes and/comments given by user B and user C to second multi-media information such as advertisement information content of Bayerische Motoren Werke are referred to as the second feedback information. User A may also like or comment on the advertisement information comment of Bayerische Motoren Werke, and the like and/or comment are referred to as the first feedback information.

Step 206: Display the first feedback information and the second feedback information in a first state, displaying being expanded without a user operation, and the first state being used for representing that the first user account and the at least one second user account in the social group can directly view feedback of each other.

Figure 8:
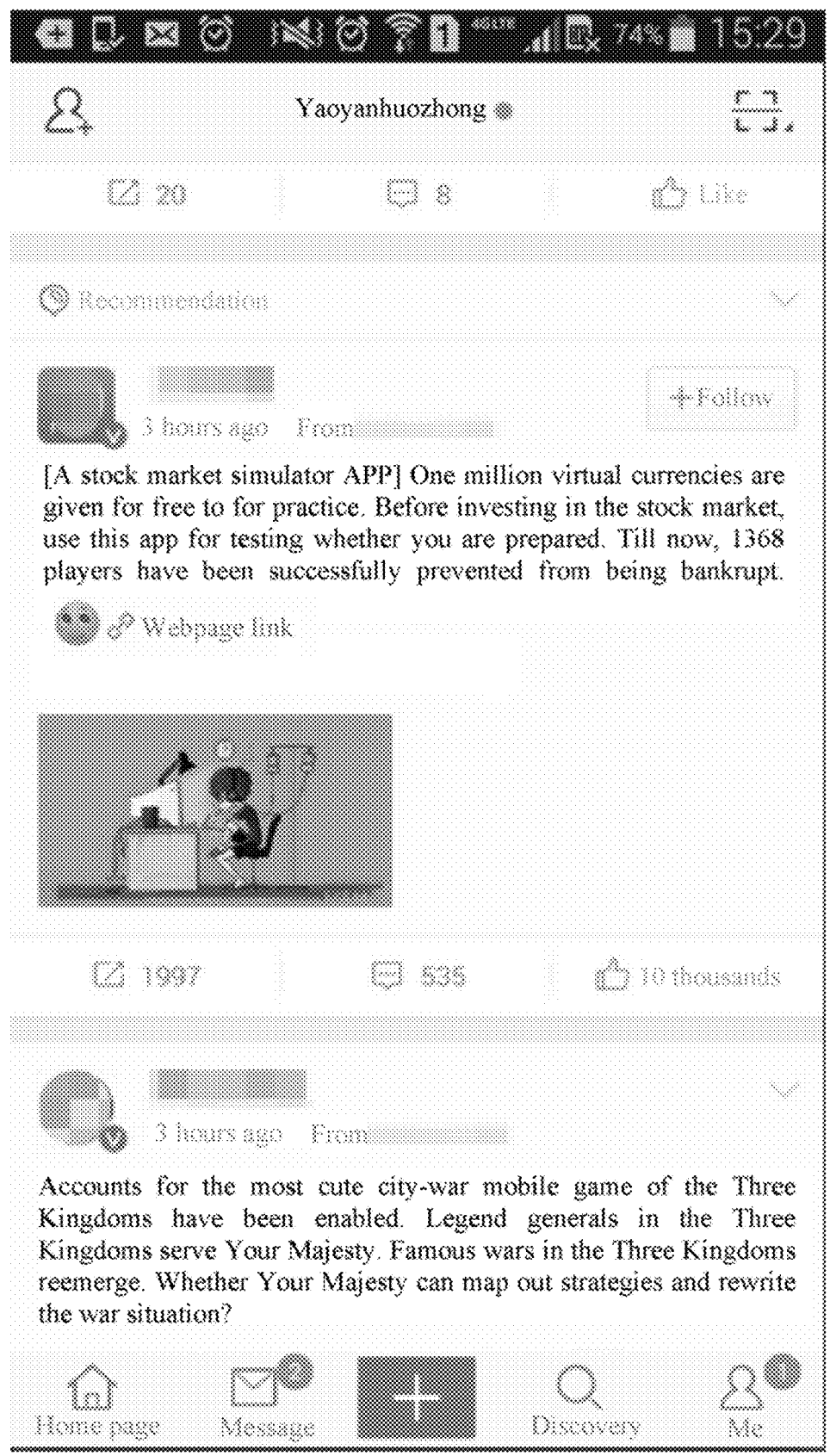
FIG. 8 is a schematic diagram showing that information is displayed on a user interface of a terminal in the existing technology.

It should be noted that step 204 to step 206 form a process of sharing the second multi-media information based on sharing among the friend circle and/or based on interaction such as likes and comments of friends in the friend circle. After the second multi-media information is shared, the first feedback information and the second feedback information that are obtained based on interaction between users for the second multi-media information are displayed externally. For example, in the Bayerische Motoren Werke advertisement shown in FIG. 9, likes and comments of the users during user interaction may be directly displayed in the moments. Compared with this, as shown in FIG. 8, display of feedback information in the Sina Microblog needs further operation of the user, for example, after the user views a prompt that there are two new comments, the user enters a next-level page, and then can view specific feedback information.

Step 207: The second multi-media information is different from first multi-media information shared by any user in the social group, the second multi-media information is specified information that conforms to a preset policy on a server side and that is pushed, and the second multi-media information and the first multi-media information are displayed in a same mode.

In an implementation manner of this embodiment of the present invention, the method further includes: sending, by the terminal, the first feedback information and the second feedback information, so that the server can analyze the first feedback information and the second feedback information and optimize a push policy of the second multi-media information.

Method Embodiment 3

Figure 3:
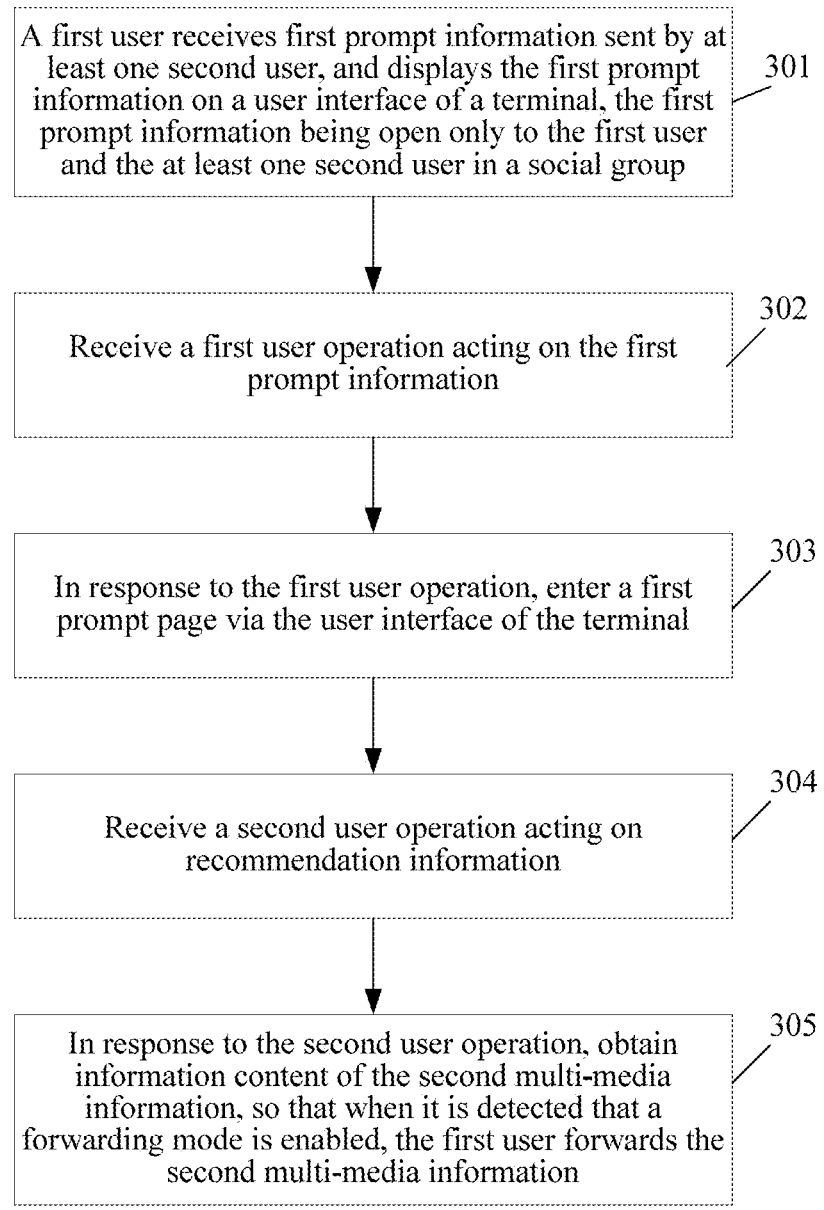
FIG. 3 is a schematic implementation flowchart according to method embodiment 3 of the present invention.

Based on method embodiment 1 or method embodiment 2, this embodiment of the present invention provides an information processing method. As shown in FIG. 3, the method is applied to a terminal, and the method includes the following steps:

Step 301: A first user account receives first prompt information sent by the at least one second user account, and displays the first prompt information on a user interface of the terminal, the first prompt information being open only to the first user account and the at least one second user account in a social group.

The first prompt information is prompt information used for triggering entering a first prompt page related to the second multi-media information. For example, the first prompt information may be a new message prompt displayed on the user interface of the terminal, for example, "One new message" is displayed on the first page shown in FIG. 11.

Step 302: Receive a first user account operation on the first prompt information.

Step 303: In response to the first user account operation, enter the first prompt page via the user interface of the terminal.

Figure 11:
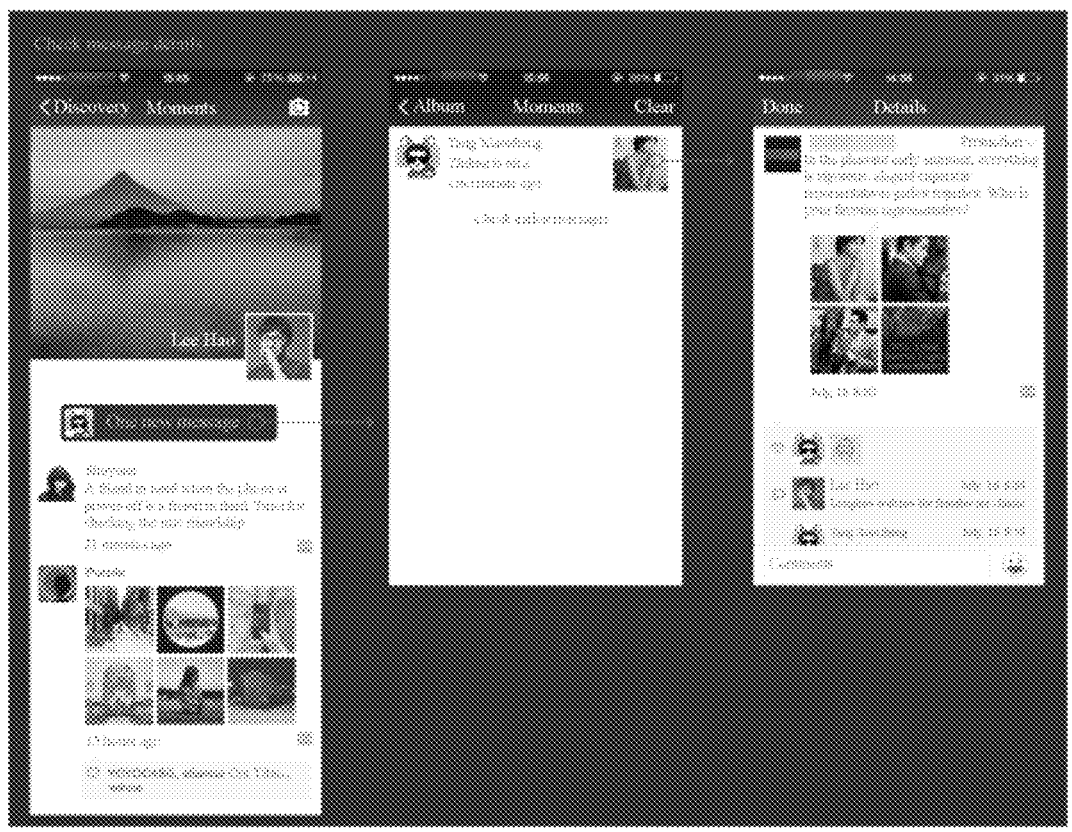

The first prompt page includes generated recommendation information, used for representing that the at least one second user account makes interaction for the second multi-media information, for the second multi-media information, for example "Zhiling is nice" on the second page shown in FIG. 11.

Step 304: Receive a second user account operation on the recommendation information.

Step 305: In response to the second user account operation, obtain information content of the second multi-media information, so that when it is detected that a forwarding mode is enabled, the first user account forwards the second multi-media information.

Figure 15:
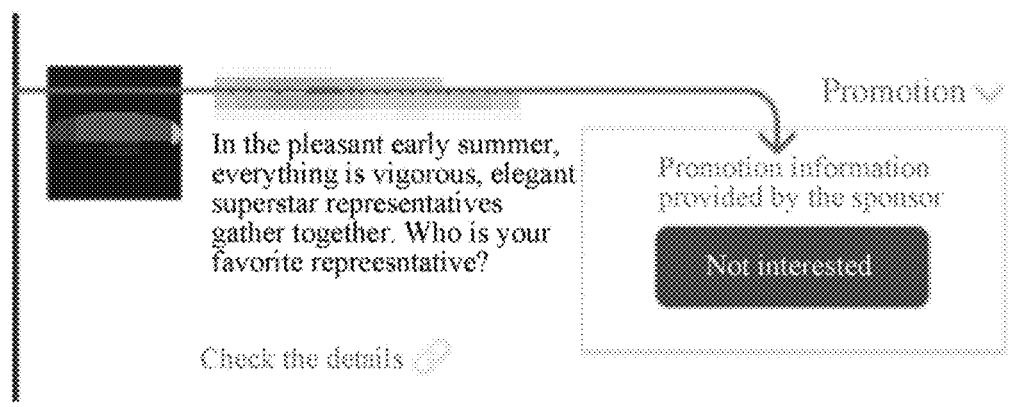

An example of this embodiment may be: Display an information sharing scenario of the moments of user A on the user interface of the terminal; if user B, a friend in one friend circle of user A, comments on one piece of second multi-media information, for example, information about cosmetics brand promotion, or comments on promotion information of Longines represented by Lin Zhiling, as shown in FIG. 11, a "new message prompt" may be displayed on the user interface of user A, and user A clicks the new message prompt to enter comment content of user B, and clicks promotion information entry in the comment content of user B to enter a presentation page of the promotion information, as shown in FIG. 11. The presentation page includes at least an icon "Promotion" and prompt information of "Check the details". After the icon "Promotion" is clicked, "The promotion information is advertisement information" may pop up, as shown in FIG. 15, to prompt whether user A is interested. If user A is not interested, it is closed and a user behavior of user A being not interested is recorded, so that the user behavior is reported to the server, for optimizing a push policy. After clicking the prompt information of "Check the details", the user enters specific content, displayed in a form of image-text, video, or recording file, of the promotion information. When a forwarding mode is enabled for the promotion information, user A may forward the promotion information.

To sum up, in this embodiment of the present invention, when a forwarding function of promotion information supporting forwarding is hidden, the promotion information can be forwarded after multiple user operations, and specific content of the promotion information is not directly displayed on the user interface of the terminal in a form of image-text, video, or recording file, to avoid that user feeds is occupied and normal use of functions by the user is affected. Compared with method embodiment 2, in method embodiment 2, likes and comments of the users for the promotion information may be directly displayed on the user interface of the terminal, so that the user can view the likes and comments directly, increasing attention of the user for the promotion.

Based on method embodiment 1, method embodiment 2, and method embodiment 3, the second multi-media information includes at least one of text, picture, video, or audio.

Terminal Embodiment 1

Figure 4:
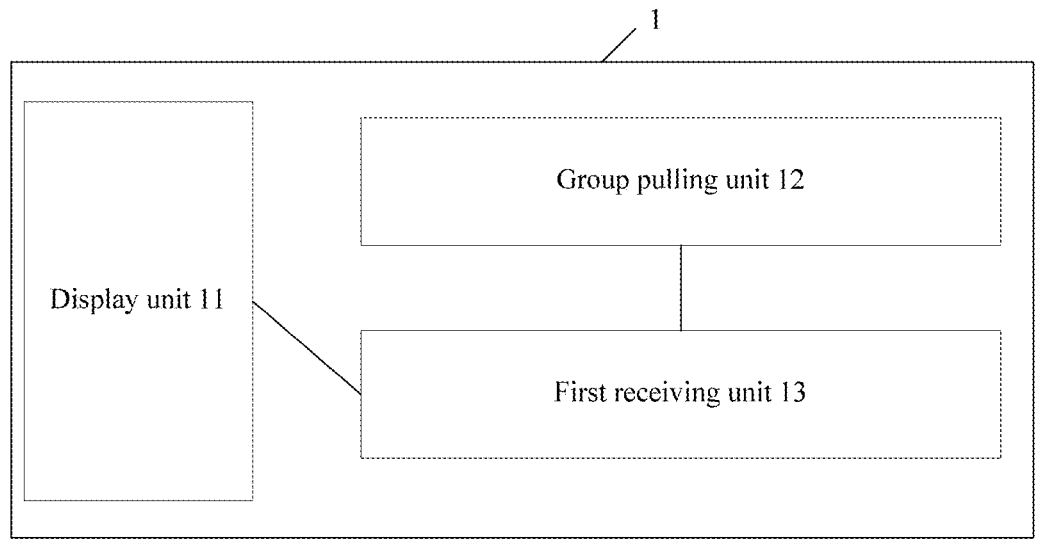
FIG. 4 is a schematic structural diagram according to terminal embodiment 1 of the present invention.

This embodiment of the present invention provides a terminal. As shown in FIG. 4, the terminal 1 includes a display unit 11. The terminal further includes a group pulling unit 12, configured to: log into, by a first user account, the terminal, and pull a social group including the first user account and at least one second user account, the second user account and the first user account belonging to the same social group; and a first receiving unit 13, configured to: receive and display, in the social group by the first user account, second multi-media information propagated by a third user account, and/or propagated second multi-media information formed based on interaction of the at least one second user account in the social group for the second multi-media information; and directly display the second multi-media information on a user interface of the terminal in an external display manner, so that the first user account can directly view information about previous interaction of the at least one second user account for the second multi-media information, and the interaction information being open only to the first user account and the at least one second user account in the social group; and the display unit 11 is configured to display the second multi-media information, the second multi-media information being different from first multi-media information shared by any user in the social group, the second multi-media information being specified information that conforms to a preset policy on a server side and that is pushed, and the second multi-media information and the first multi-media information being displayed in a same mode.

It should be noted that, the second multi-media information is not information pushed by any people not in the social group. For example, on some social platforms, for example, SINA Microblog, Su'ning appliance secretary may push some recommendation information to the user even if the Su'ning appliance secretary is not a friend in the social group (for example, the friend circle) of the user. The second multi-media information in this embodiment of the present invention is specified information that is reviewed by the background server, that conforms to the preset policy on the background server side, and that is pushed. Advantages are: Harassment information pushed by a user not in the friend circle is avoided, and the specified information that conforms to the preset policy on the background server side and that is pushed is a result obtained after behaviors of the users in the friend circle are recorded, collected, and analyzed. Therefore, the second multi-media information in this embodiment of the present invention can satisfy a requirement for accurate user positioning of information pushing and sharing.

Terminal Embodiment 2

Based on terminal embodiment 1, the display unit is further configured to display interaction information. The interaction information includes first feedback information and/or second feedback information, the first feedback information and the second feedback information are displayed in a first state, and displaying being expanded without a user operation. The first state is used for representing that the first user account and the at least one second user account in the social group can directly view feedback of each other. The first feedback information includes first feedback information formed when the first user account receives the second multi-media information, and the second feedback information includes second feedback information formed when the at least one second user account makes interaction for the second multi-media information.

Terminal Embodiment 3

Based on terminal embodiment 1, the terminal further includes: a first reporting unit, configured to report the first feedback information and the second feedback information, so that the server can analyze the first feedback information and the second feedback information and optimize a push policy of the second multi-media information. The display unit is further configured to display the second multi-media information on the user interface of the terminal in at least one form of text, picture, video, or audio, there being a first interaction object when the second multi-media information is displayed.

The terminal further includes:

a second receiving unit, configured to receive a third user operation on the first interaction object;

a first responding unit, configured to: in response to the third user operation, display second prompt information, the second prompt information being used for prompting the first user account whether to continue to follow information content of the second multi-media information; and a second reporting unit, configured to receive a fourth user operation on the second prompt information, to obtain third feedback information for the second prompt information and report the third feedback information to the server.

Terminal Embodiment 4

Based on terminal embodiment 1, the display unit is further configured to: display the second multi-media information on the user interface of the terminal in at least one form of text, picture, video, or audio, there being a second interaction object when the second multi-media information is displayed.

The terminal further includes:

a third receiving unit, configured to receive a fifth user operation on the second interaction object;

a second responding unit, configured to: in response to the fifth user operation, enter a first information page, the first information page being used for displaying information content of the second multi-media information; and a first processing unit, configured to choose to follow the information content of the second multi-media information on the first information page, to establish association between the first user account and the third user account, or directly trigger entering an official account, to enter an information content page, provided by the third user account associated with the first user account, for the second multi-media information.

For the preset policy on the background server side in the foregoing embodiment, the preset policy for pushing an advertisement includes the following content:

First, for related background pushing logic configured on the server in the preset policy, 1) when a user clicks "Not interested", no matter whether there are likes or comments for the advertisement, the advertisement disappears; 2) logic for viewing a message prompt after the advertisement disappears is similar to a disappearance processing mechanism in the local; if a message is prompted on a floating layer in the feeds, after the prompt is clicked, no item of the message can be clicked and it is controlled by the server; if the user enters a message prompt list via a personal page, the terminal may be responsible for executing the disappearance processing mechanism; 3) after the user clicks "Not interested", the same advertisement shall not be pushed to the user again; 4) advertisement content of a same advertiser may not be pushed to the user within two weeks; 5) a weight at which the user views an advertisement of this industry is decreased, and an increase or a decrease of the weight may be recorded by means of an operator; 6) if the user clicks "Not interested" for an advertisement of an advertiser twice, advertisements of the advertiser may not be pushed to the user subsequently; 7) if the user clicks "Not interested" for an advertisement of an industry twice, after the second click, advertisements of this industry may not be pushed to the user within one month.

Second, for how to filter a first round of users for preferential pushing in the preset policy, a seed user is selected. An advertisement may be pushed to a social node user (seed user) at the beginning. Two types of users conform to definition of the seed user: A. active user: logging into the WeChat more than eight times every day, sending more than 50 messages every day, and having more than 500 friends; B. opinion leader: each message in the moments receiving more than 30 likes, and giving more than 10 likes on average every day. These people are pre-defined as seed users, and the server may preferentially push advertisements to these users.

Third, for sequenced display of social shuffling that is performed, in the friend circle based on the relationship link, on advertisements displayed on the user interface of the terminal in the preset policy, a major feature of advertisements in the friend circle is social propagation. After a user makes interaction for the advertisement, when a friend of the user subsequently views the advertisement attached with interaction, the advertisement may have greater effect on the friend. Therefore, for the policy, if user A views an advertisement X, and likes or comments on the advertisement, a probability of viewing, by a friend of user A, the advertisement X subsequently is increased, and the advertisement A is more easily displayed to the friend of user A when competing with other advertisements. If user B enters the moments, and there are multiple advertisements that friends of user B like or comment on, a weight at which an advertisement having a largest quantity of likes and comments is displayed to user B is the largest.

Based on a design principle of sequenced display of social shuffling, the following mechanism may be used for implementation.

Social shuffling: When a user enters the moments, if an appearance condition of an advertisement is reached, assuming that there are three advertisements, and all three advertisements satisfy an orientation of user A, which advertisement is pushed to the user A is determined according to the following rules (assuming that the orientations are consistent): exposure weight=(a quantity of likes given by friends of the user to each advertisement*0.5+a quantity of the first comments given by the friends to the advertisement*0.35+a total like rate of the advertisement (a total quantity of likes/a total quantity of exposure people)*0.15)*a correction factor R. The correction factor R is defined as: If the friends give more than 50 comments to the advertisement, because there are too many likes and comments, and the exposure rate of the advertisement is too high, an appearance probability is decreased, and R=0.5. At another moment, R=1.

Fourth, for other logic in the preset policy, 1) for example, for an appearance opportunity of an advertisement, to limit a quantity of times of exposures of advertisements to a same user, it is set: When the user visits the moments, only when there are four or more than four pieces of new content, one advertisement is pushed; one advertisement is pushed to a user every 48 hours; a time interval may be adjusted flexibly; 2) for example, for an appearance position of an advertisement, when four or more than four pieces of new content are generated, an advertisement may appear in a position following the fourth content (content pushed by the user is not counted); once the advertisement is generated, the advertisement may not be always in the position of the fifth content; as new messages emerge, the advertisement gradually sinks (for example, there are five pieces of content at the beginning, and then, some friends push five pieces of content in the moments, and in this case, the advertisement is displayed in a position of the tenth content); 3) for example, for a disappearance policy, when a user views an advertisement, if the user likes or comments on the advertisement, the advertisement may stay in the moments of the user; if the user gives no like or comment to the advertisement within six hours, the advertisement may disappear from the moments of the user sixth hours after the user views the advertisement for the first time.

It should be noted that, the preset policies involved in the fourth article may be implemented on the server side, or on the terminal side. There are the following implementation manners.

Implementation manner 1: a specific implementation of an appearance opportunity of the second multi-media information (for example, advertisement information) is as follows:

In addition to the display unit 11, the group pulling unit 12, and the first receiving unit 13, the terminal in this embodiment of the present invention further includes:

a first detection unit, configured to detect whether a first preset condition is satisfied, to obtain a detection result, the first preset condition being used for representing a trigger opportunity of actively pulling, by the first user account, the second multi-media information; and a first processing execution unit, configured to: if the detection result is that the first preset condition is satisfied when the second multi-media information received and displayed by the first user account in the social group is greater than or equal to a first threshold, actively pull, by the first user account, the second multi-media information.

The first threshold may be: four pieces of new content are received and displayed.

Implementation manner 2: another specific implementation of an appearance opportunity of the second multi-media information (for example, advertisement information) is as follows:

In addition to the display unit 11, the group pulling unit 12, and the first receiving unit 13, the terminal in this embodiment of the present invention further includes:

a second detection unit, configured to detect whether a second preset condition is satisfied, to obtain a detection result, the second preset condition being used for representing a trigger opportunity of actively periodically pulling, by the first user account, the second multi-media information; and a second processing execution unit, configured to: if the detection result is that the second preset condition is satisfied when a time interval at which the first user account pulls the second multi-media information reaches a time interval specified in a second threshold, actively pull, by the first user account, the second multi-media information.

The time interval specified in the second threshold may be 48 hours.

Implementation manner 3: a specific implementation of an appearance position of the second multi-media information (for example, advertisement information) is as follows:

In addition to the display unit 11, the group pulling unit 12, and the first receiving unit 13, the terminal in this embodiment of the present invention further includes:

a third detection unit, configured to detect whether a third preset condition is satisfied, to obtain a detection result, the third preset condition being a condition for setting an appearance position of the second multi-media information in feeds; and a third processing execution unit, configured to: if the detection result is that the third preset condition is satisfied when the appearance position of the second multi-media information in the feeds is greater than or equal to a first display position specified in a third threshold, display the second multi-media information in the first display position.

The first display position specified in the third threshold may be a position of the fifth content following the fourth new content.

In an implementation manner of this embodiment of the present invention, the display unit is further configured to: as new information is received and displayed in the social group, display, in a second display position, the second multi-media information displayed in the first display position, the second display position being greater than the first display position. For example, the second display position is a display position of the tenth content, and the first display position is a display position of the fifth content.

Implementation manner 4: a specific implementation of a disappearance policy of the second multi-media information (for example, advertisement information) is as follows:

In addition to the display unit 11, the group pulling unit 12, and the first receiving unit 13, the terminal in this embodiment of the present invention further includes:

a fourth detection unit, configured to detect whether a fourth preset condition is satisfied, to obtain a detection result, the fourth preset condition being a condition for setting that the second multi-media information disappears from feeds; and a fourth processing execution unit, configured to: if the detection result is that the fourth preset condition is satisfied when no user in the social group feeds back to the second multi-media information within a time period specified in a fourth threshold, enable the second multi-media information to disappear from the feeds.

The time period specified in the fourth threshold may be 6 hours.

A start time point of the time period specified in the fourth threshold is a time when the second multi-media information appears in the feeds and the first user account follows the second multi-media information at the first time.

In an implementation manner of this embodiment of the present invention, content of the second multi-media information is reviewed by the server and is customized by the third user account, and the third user account includes an individual user or a collective user that is registered in the server via an official account.

In an implementation manner of this embodiment of the present invention, the display unit is further configured to: display the second multi-media information on the user interface of the terminal, the second multi-media information being open only to the first user account and the at least one second user account in the social group.

In an implementation manner of this embodiment of the present invention, the display unit is further configured to display, on the user interface of the terminal, the first feedback information formed when the first user account receives the second multi-media information and/or the second feedback information formed when the at least one second user account makes interaction for the second multi-media information. The first feedback information and the second feedback information are displayed in a first state, displaying is expanded without a user operation, and the first state is used for representing that the first user account and the at least one second user account in the social group can directly view feedback of each other.

Accordingly, the terminal may further include a sending unit, configured to send and display, in the social group by the first user account, the first multi-media information, and configured to: send the first feedback information and the second feedback information, so that the server can analyze the first feedback information and the second feedback information and optimize the push policy of the second multi-media information.

In an implementation manner of this embodiment of the present invention, the second receiving unit is further configured to receive, by the first user account, first prompt information sent by the at least one second user account; and the display unit is further configured to display the first prompt information on the user interface of the terminal, the first prompt information being open only to the first user account and the at least one second user account in the social group, and the first prompt information being prompt information used for triggering entering a first prompt page related to the second multi-media information.

In an implementation manner of this embodiment of the present invention, the terminal further includes a third receiving unit, configured to receive a first user account operation on the first prompt information; a first responding unit, configured to: in response to the first user account operation, enter a first prompt page via the user interface of the terminal, the first prompt page including generated recommendation information, used for representing that the at least one second user account makes interaction for the second multi-media information, for the second multi-media information; a fourth receiving unit, configured to receive a second user account operation on the recommendation information; and a second responding unit, configured to: in response to the second user account operation, obtain information content of the second multi-media information, so that when it is detected that a forwarding mode is enabled, the first user account forwards the second multi-media information.

Method Embodiment 4

Figure 5:
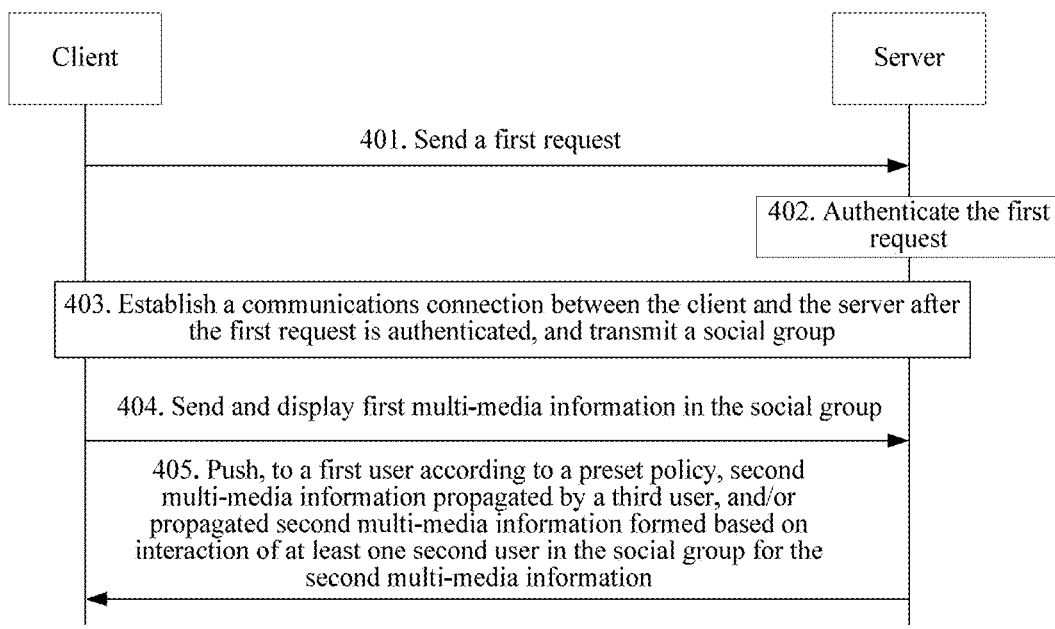
FIG. 5 is a schematic implementation flowchart according to method embodiment 4 of the present invention.

This embodiment of the present invention provides an information processing method. As shown in FIG. 5, the method is an interaction process between a terminal and a server, and the method includes the following steps:

Step 401: A first user account logs into the terminal and sends a first request.

Step 402: The server receives the first request and authenticates the first request.

Step 403: After the authentication, establish a communications connection between the terminal and the server, and transmit, based on the communications connection, a social group including the first user account and at least one second user account.

The second user account and the first user account belong to the same social group.

Step 404: The first user account sends and displays first multi-media information in the social group.

This step is an optional step, and is not a necessary step.

Step 405: Push, to the first user account according to a preset policy, second multi-media information propagated by a third user account, and/or propagated second multi-media information formed based on interaction of the at least one second user account in the social group for the second multi-media information; and control the pushed second multi-media information to be displayed on the user interface of the terminal, and be open only to the first user account and the at least one second user account in the social group.

The second multi-media information may be implemented according to configuration of the server or configuration of the terminal, so that the second multi-media information can be directly displayed on the user interface of the terminal in an external display manner, and the first user account can directly view information about the previous interaction of the at least one second user account for the second multi-media information, the second multi-media information being open only to the first user account and the at least one second user account in the social group.

The second multi-media information is different from first multi-media information shared by any user in the social group, the second multi-media information is specified information that conforms to the preset policy on the server side and that is pushed, and the second multi-media information and the first multi-media information are displayed in a same mode.

Method Embodiment 5

Based on method embodiment 4, in the information processing method in this embodiment of the present invention, the pushing, to the first user account according to a preset policy, second multi-media information propagated by a third user account, and/or propagated second multi-media information formed based on interaction of the at least one second user account in the social group for the second multi-media information includes:

Step 501: Extract a first filtering criterion corresponding to a seed user from the preset policy, the seed user being obtained by detecting whether a user is active and/or whether a user is an opinion leader.

Step 502: Detect the seed user from the at least one second user account according to the first filtering criterion, and push the second multi-media information to the seed user, to establish a first interaction relationship between the seed user and the second multi-media information.

Step 503: Push, preferentially to the first user account, the propagated second multi-media information formed after interaction is made based on the first interaction relationship.

The seed user is a social node user to which promotion information, such as advertisement information, is pushed at the first time. Two types of users conform to the first filtering criterion of the seed user: 1) whether a user logs in actively, whether a user has sufficient fans, and whether a user sends a large amount of information; 2) users such as opinion leaders or famous VIP users verified by the Sina Mircroblog. The promotion information is exposed to the seed user preferentially according to the preset policy of the server, and then, the seed user makes interaction for the promotion information to establish an interaction relationship and continues to share the promotion information, so that attention of another user to the promotion advertisement is greatly increased, providing a basis for accurately pushing information to users.

Method Embodiment 6

Based on method embodiment 4, in the information processing method in this embodiment of the present invention, the pushing, to the first user account according to a preset policy, second multi-media information propagated by a third user account, and/or propagated second multi-media information formed based on interaction of the at least one second user account in the social group for the second multi-media information includes:

Step 601: Extract a second filtering criterion corresponding to a target user having a preset attribute with a first user account from the social group according to the preset policy, the target user being obtained by detecting whether a user follows or makes interaction in similar or related fields as the first user account.

Step 602: Detect the target user having the preset attribute with the first user account from the at least one second user account according to the second filtering criterion, and push the second multi-media information to the target user, to establish a second interaction relationship between the target user and the second multi-media information.

Step 603: When multiple pieces of second multi-media information contend for pushing, obtain, from the multiple pieces of second multi-media information, propagated second multi-media information formed after interaction is made based on the second interaction relationship, and preferentially push the second multi-media information to the first user account.

The target user having the preset attribute with the first user account may be a user that is associated with the first user account in similarity and intimacy. Due to this association between the target user and the first user account, recognition of and attention to the promotion information are different from those of another user, to provide a basis for accurately pushing information to the users. In addition, when there are multiple pieces of promotion information, one of the multiple pieces of promotion information is preferentially pushed according to the second filtering criterion. For example, when advertisement A and advertisement B contend for pushing, if a relationship between user E and user F is more intimate than a relationship between user E and user G, advertisement B rather than advertisement A is preferentially pushed to user E according to an interaction relationship between user G and advertisement B.

Method Embodiment 7

Based on method embodiment 4, in the information processing method in this embodiment of the present invention, the pushing, to the first user account according to a preset policy, second multi-media information propagated by a third user account, and/or propagated second multi-media information formed based on interaction of the at least one second user account in the social group for the second multi-media information includes:

Step 701: Extract, from the preset policy, a social shuffling policy used for displaying multiple pieces of second multi-media information on the terminal, as shown in the following formula (1).

Step 702: Receive first feedback information sent by the first user account and at least one piece of second feedback information sent by the at least one second user account.

Step 703: Input a parameter control factor that is formed by the first feedback information and/or the second feedback information, and a correction factor into the social shuffling policy, to obtain exposure weights corresponding to the multiple pieces of second multi-media information.

Exposure weight=(a quantity of likes given by friends of the user to each advertisement*0.5+a quantity of the first comments given by the friends to the advertisement*0.35+a total like rate of the advertisement (a total quantity of likes/a total quantity of exposure people)*0.15)*a correction factor R formula (1)

The parameter control factor is a collective name of likes, comments, and the total in formula (1). The correction factor R is defined as: If the friends give more than 50 comments to the advertisement, an appearance probability is decreased, R=0.5. At another moment, R=1.

Step 704: Push, to the first user account according to a descending order of the exposure weights, multiple pieces of second multi-media information corresponding to the exposure weights in descending order.

Server Embodiment 1

Figure 6:
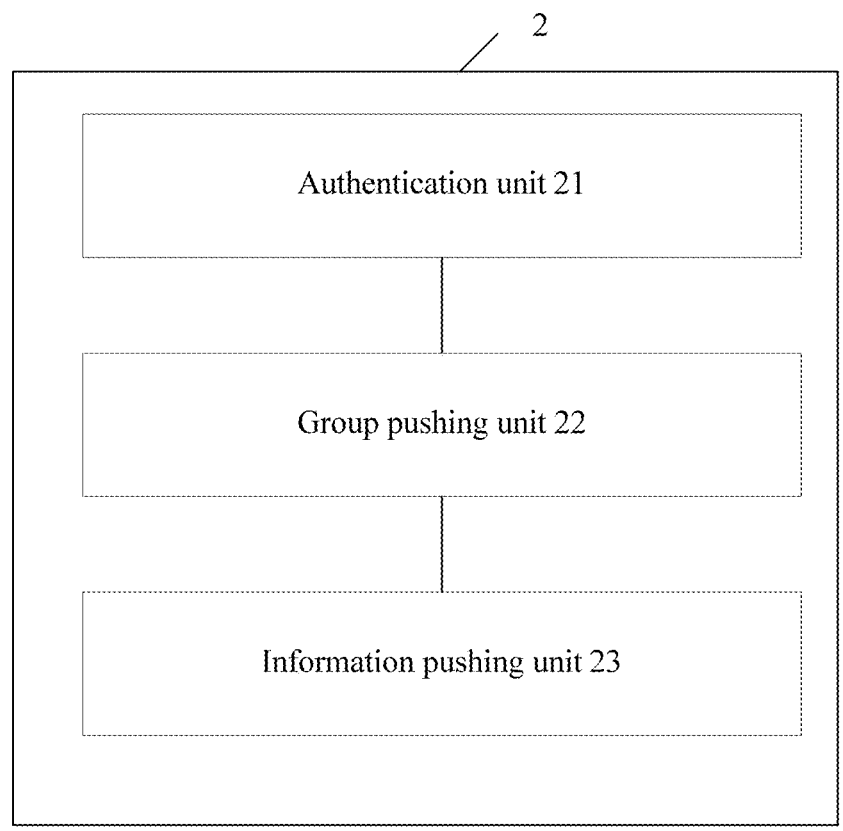
FIG. 6 is a schematic structural diagram according to server embodiment 1 of the present invention.

An embodiment of the present invention provides a server. As shown in FIG. 6, the server 2 includes:

an authentication unit 21, configured to receive a first request sent by a first user account after the first user account logs into a terminal, and establish a communications connection between the terminal and the server after the first request is authenticated; a group pushing unit 22, configured to push, based on the communications connection, a social group including the first user account and at least one second user account, the second user account and the first user account belonging to the same social group; and an information pushing unit 23, configured to push, to the first user account according to a preset policy, second multi-media information propagated by a third user account, and/or propagated second multi-media information formed based on interaction of the at least one second user account in the social group for the second multi-media information; and control the pushed second multi-media information to be displayed on a user interface of the terminal, and open only to the first user account and the at least one second user account in the social group. The second multi-media information may be implemented according to configuration of the server or configuration of the terminal, so that the second multi-media information can be directly displayed on the user interface of the terminal in an external display manner, and the first user account can directly view information about the previous interaction of the at least one second user account for the second multi-media information, the second multi-media information being open only to the first user account and the at least one second user account in the social group.

The second multi-media information is different from first multi-media information shared by any user in the social group, the second multi-media information is specified information that conforms to a preset policy on a server side and that is pushed, and the second multi-media information and the first multi-media information are displayed in a same mode.

In an implementation manner of this embodiment of the present invention, the information pushing unit further includes a first extraction subunit, configured to: extract a first filtering criterion corresponding to a seed user from the preset policy, the seed user being obtained by detecting whether the user is active and/or whether the user is an opinion leader; a first detection subunit, configured to detect the seed user from the at least one second user account according to the first filtering criterion, and push the second multi-media information to the seed user, to establish a first interaction relationship between the seed user and the second multi-media information; and a first push subunit, configured to push, to the first user account preferentially, the propagated second multi-media information formed after interaction is made based on the first interaction relationship.

In an implementation manner of this embodiment of the present invention, the information pushing unit further includes a second extraction unit, configured to extract a second filtering criterion corresponding to a target user having a preset attribute with the first user account in the social group from the preset policy, the target user being obtained by detecting whether the user follows and/or makes interaction in similar or related fields as the first user account; a second detection subunit, configured to: detect the target user having the preset attribute with the first user account from the at least one second user account according to the second filtering criterion, and push the second multi-media information to the target user, to establish a second interaction relationship between the target user and the second multi-media information; and a second pushing subunit, configured to: when multiple pieces of second multi-media information contend for pushing, obtain, from the multiple pieces of second multi-media information, the propagated second multi-media information formed after interaction is made based on the second interaction relationship, and preferentially push the second multi-media information to the first user account.

In an implementation manner of this embodiment of the present invention, the server further includes an information receiving unit, configured to receive first multi-media information that is sent and displayed by the first user account in the social group, and configured to: receive first feedback information sent by the first user account and at least one piece of second feedback information sent by the at least one second user account.

Accordingly, the information pushing unit further includes a third extraction subunit, configured to extract, from the preset policy, a social shuffling policy for displaying the multiple pieces of second multi-media information on the terminal; an operation subunit, configured to input a parameter control factor that is formed by the first feedback information and/or the second feedback information, and a correction factor into the social shuffling policy, to obtain exposure weights corresponding to the multiple pieces of second multi-media information; and a third pushing subunit, configured to push, to the first user account according to a descending order of the exposure weights, multiple pieces of second multi-media information corresponding to the exposure weights in descending order.

The following describes the embodiments of the present invention by using actual application scenarios as examples.

Application Scenario 1

Figure 7:
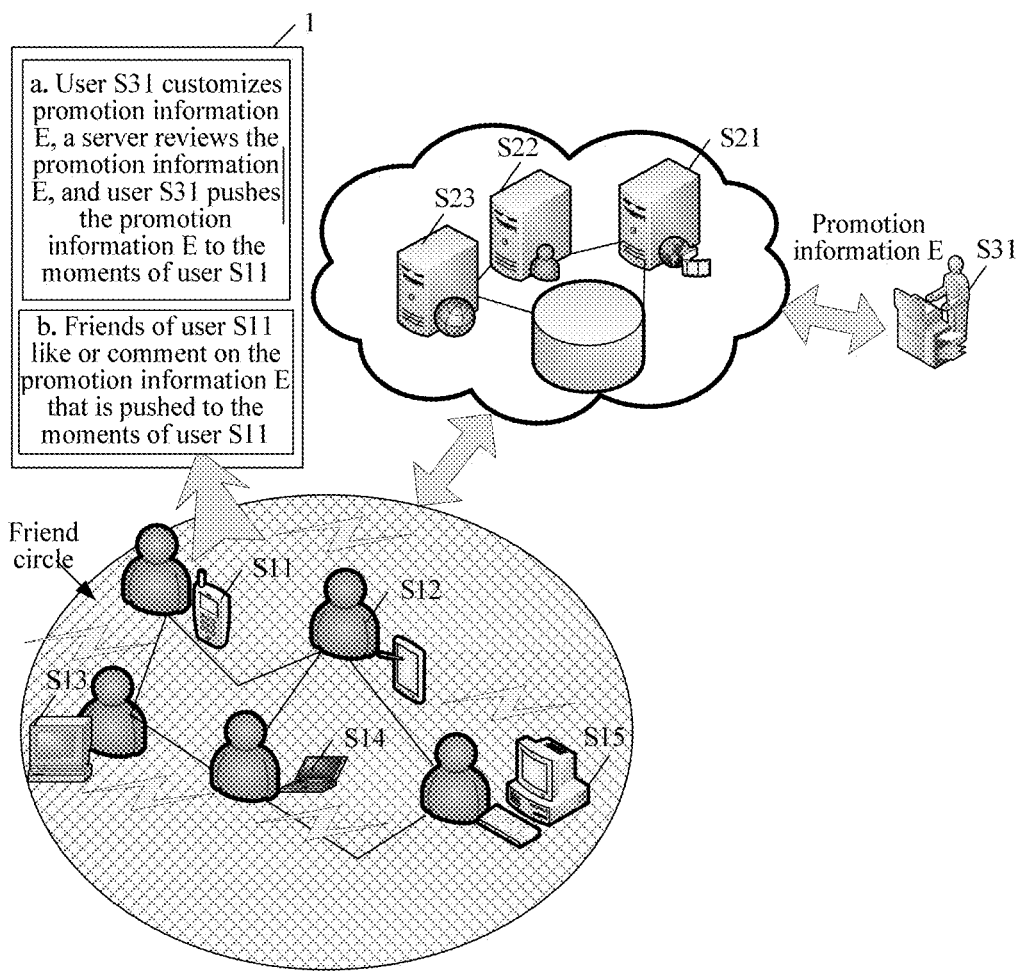
FIG. 7 is a schematic diagram of an application scenario to which embodiments of the present invention are applied.

As shown in FIG. 7, an embodiment of a user scenario formed by the terminal and the server includes a friend circle formed by users S11 to S15. The users S11 to S15 are respectively equipped with different terminals, for example, mobile phones, PADs, or notebook computers. User S11 is the first user account mentioned in the foregoing embodiment, users S12 to S15 are the at least one second user account mentioned in the foregoing embodiment, and user S31 is an advertiser that shares promotion information E based on an official account. Servers S21 to S23 are various servers. The promotion information E is processed, for example, reviewed, by various servers, for example, a content server, a multi-media server, a social group server, an operation server, and a database. For example, a preset policy is configured, various processings are how to display the promotion information on a user interface of a terminal 1 of user S11. Reviewed promotion information E and information that is pushed by the user S11 and that is not reviewed are displayed on the user interface of the terminal 1 in a same display mode according to the preset policy. The user interface of the terminal 1 includes at least two parts of information: a. the promotion information E that is customized by user S31, that is reviewed, and that is pushed in the moments of user S11; b. interaction such as likes or comments given by friends in the friend circle of user S11 to the promotion information E that is customized, that is reviewed, and that is pushed in the moments of user S11.

Comparison between the existing technology and an application scenario using the embodiments of the present invention is as follows:

Description is made by using pushing and displaying of feeds advertisement in Sina Microblog in the existing technology and in WeChat in this application scenario as an example. The Sina Microblog is a mobile end product on which feeds advertisement emerges earlier. As a social application, the Microblog is similar to the moments of WeChat in product attribute: Users can publish content, and interaction and discussions are made on the content sent by the users. A difference between advertisement pushing in the moments in this application scenario and advertisement pushing in Sina Microblog from the perspective of product design mainly lies in that:

1) Comments, forwards, and likes in Sina Microblog are open. That is, user A comments on an advertisement, no matter whether another user is a friend of user A, the another user can view content of comments, replies, and likes of user A, and can directly check personal information of user A, and replies to the comments on the advertisement. This social form is open, and has advantages, for example, original content of the user is very rich, and discussions in a larger range are made more easily. However, there are disadvantages, users may feel insecure, and a psychological threshold of the user to make interaction for the advertisement is increased. Because one hot advertisement may be viewed by millions of users, and comments of the user are exposed to so many people that are not friends of the user, the user may be concerned about leakage of privacy, and may not speak out freely. For the advertisement in the moments, comments, likes, and replies for the advertisement are secret. A comment of user A for an advertisement can be viewed only by one-dimensional friends of user A, and those who are not friends of user A cannot view the comments of user A, and further cannot interact with user A. Therefore, privacy of user A is effectively protected, a psychological threshold of the user to make interaction for the advertisement is decreased, facilitating interaction in the circle.

Figure 9:
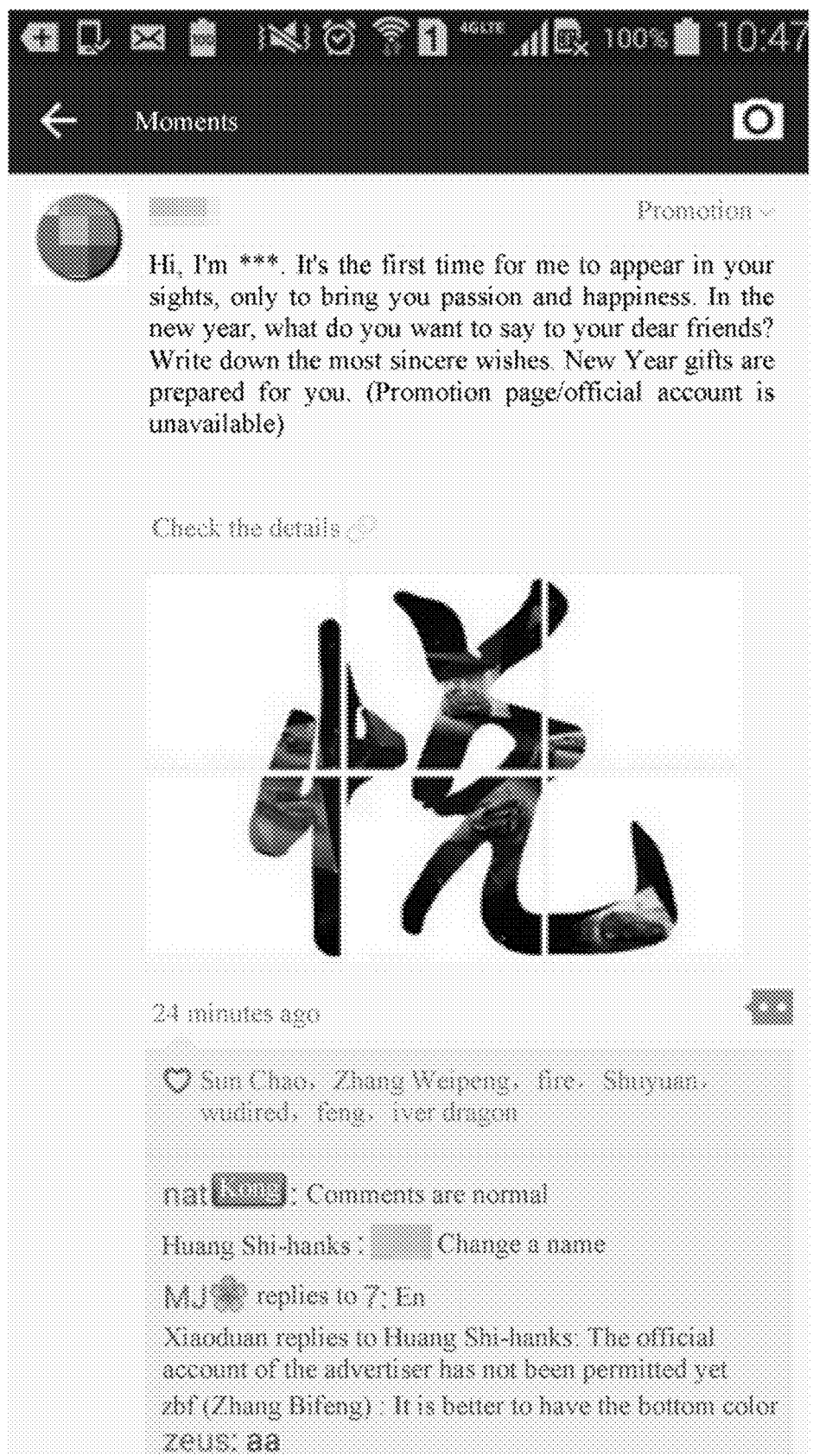
FIG. 9 to FIG. 18 are schematic diagrams showing that information is displayed on a user interface of a terminal in an application scenario to which embodiments of the present invention are applied.

2) As shown in FIG. 8, comments in Sina Microblog are retracted, while in this application scenario, comments on the advertisement in WeChat is externally displayed, as shown in FIG. 9. In Sina Microblog, if you want to view comments on an advertisement, the user needs to click the advertisement, or click the button "Comment" on the page, to view the comments of all users on the advertisement. An addition of one step may cause losses of some users, and many valuable comments cannot be viewed by the users. In the advertisement in the moments, the user may directly view comments of friends under the advertisement, and when the user views an advertisement that many friends like and comment on, attention of the user to this advertisement may be higher.

Figure 10:
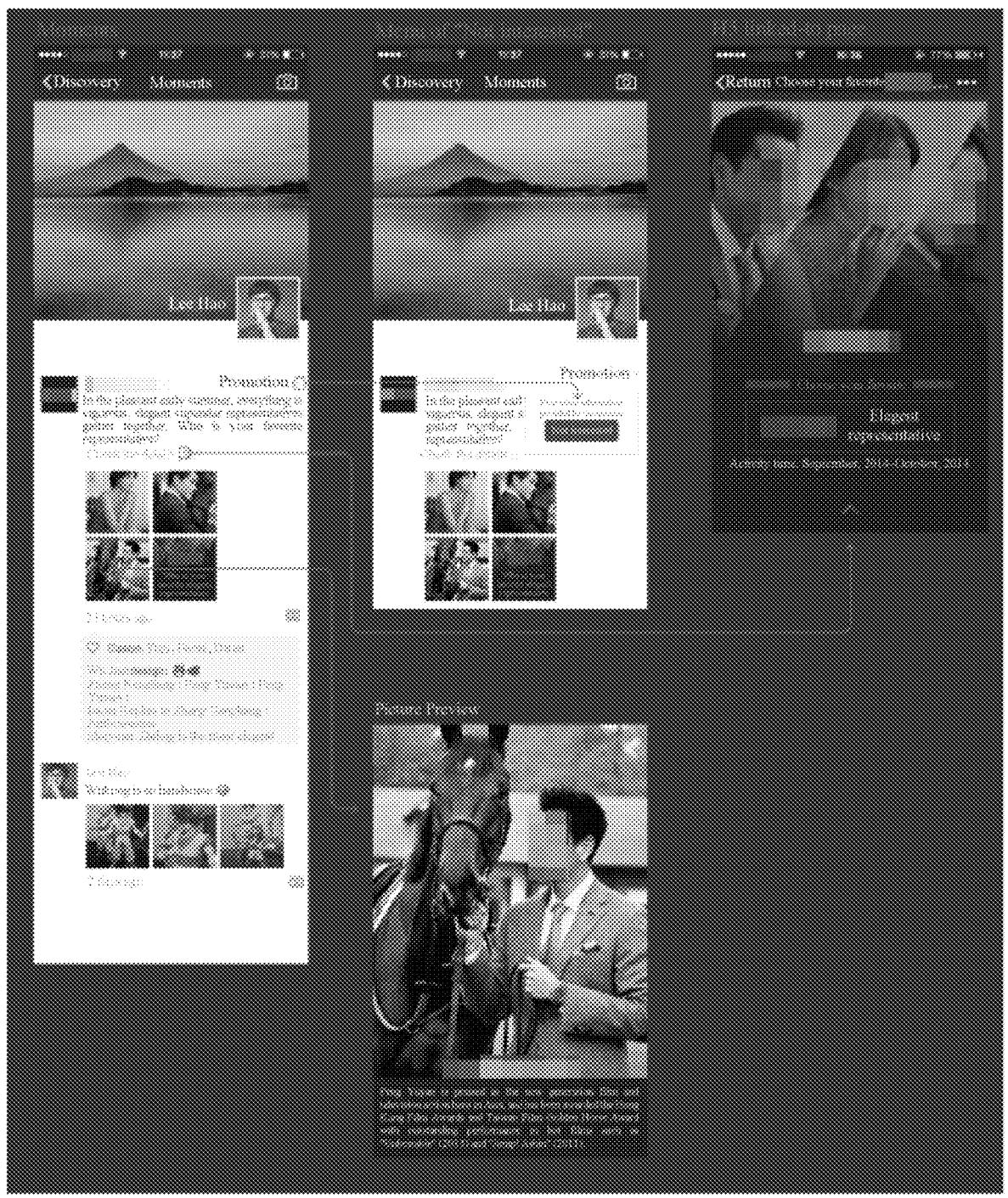

3) Advertisement in the moments cannot be forwarded, while the Sina Microblog advertisement may be forwarded. When the user browses Sina Microblog, and views an interesting advertisement, the user may forward the advertisement. Advantages of the setting are: The advertisement can be propagated in a wider range, and disadvantages are: Propagation of the advertisement cannot be controlled, reducing a proportion of original content in the feeds, and affecting the environment of the social platform. In the advertisement in the moments, a forwarding function of the advertisement is limited. First, no advertisement is set on an outer layer of the feeds advertisement. As shown in FIG. 10 or FIG. 11, when the user clicks "Check the details", the user may enter a promotion page of the advertiser. On this page, the user may forward the advertisement by clicking the button " . . . " at the upper right corner. In this case, a threshold for forwarding is increased accordingly. In addition, as an optional function, the forwarding function is controlled by the platform. During advertising, a button is designed. Some advertisements that are not suitable for forwarding may not get the forwarding permission.

As can be seen from the comparison: 1) In this application scenario, the feeds advertisement in the moments of the WeChat is promoted based on the secret group of friend circle rather than all people. Therefore, under the premise of accurate advertisement pushing positioning, a threshold for interaction between the user and the advertisement is increased. For example, on the social platforms such as Sina Microblog and Facebook, a user comments on or likes an advertisement, both friends and non-friends of the user may view the comments and likes. In this case, content created by the user is not secret, a threshold for giving comments and likes in an open environment is relatively high. In the advertisement in the moments, all comments and likes can be viewed only by friends, and privacy can ensure that people may make interaction for the advertisement at ease, thereby improving security of information sharing in the interaction. 2). Interaction between the user and the advertisement may cause an impact on friends of the user. After the user likes or comments on an advertisement in the moments, a friend of the user views information about the comments and likes directly on an outer layer. Interaction of the friend may attract your attention to the advertisement. Because friends are better than strangers in two aspects: similarity and intimacy, under the effect of the two aspects, the user may trust the friends in the comments and attitudes to the advertisement (may obtain a critical comment positively or negatively), and may easily have an impression on the brand advertisement, thereby increasing the attention. The attention provides a reference basis for accurate positioning of advertisement pushing. 3) Interaction between the user and the advertisement affects propagation of the advertisement in the social relationship link. This is the core of propagation of social relationship in the moments of WeChat. Previously, for the advertisement in Sina Microblog, for both user attribute and context, which advertisement is pushed to the user is determined according to factors of people or environment. For the advertisement in the moments of WeChat, an advertisement for which friends of the user make interaction is preferentially pushed to the user according to social shuffling. Therefore, the user may not miss valuable information, a probability of obtaining the valuable information is increased, and wastes of human costs caused by seeking valuable information in vast feeds can be avoided.

In conclusion, by means of this application scenario, in one aspect, due to accurate positioning of advertisement pushing, sharing of secret information is secure, and it is avoided that a large amount of invalid information is pushed. Therefore, not many network resource bandwidths are occupied, and a success rate at which the foreground terminal pulls valid multi-media information is increased, for example, 50 pieces of multi-media information are pulled and 48 pieces of information are useful to the user, so that occupation and wastes of system resources of the foreground terminal are avoided. In another aspect, because timeliness in which the second multi-media information is shared to all users is increased, sharing is in time, attention and recognition of the user to the information are high, so that the valuable information may not be drown in the vast feeds. In addition, an exposure time of the valuable information is controllable. Therefore, the user may not miss the probability and opportunity of obtaining valuable information, human costs are reduced, power consumption of the foreground terminal is not wasted, and processing resources, for example, CPU or buffer, of the foreground terminal may not be occupied.

Application Scenario 2

A form for displaying an advertisement on a user interface of a terminal in application scenario 1 is described as follows, and is divided into the following several parts.

1. For an advertisement form, the advertisement form is consistent with a form of feeds in the moments. As shown in FIG. 10, a form of text plus picture may be supported. "WeChat promotion" is marked at the upper right corner, an icon "Promotion" is aligned with the right side of "likes and comments", and is in center alignment with a nickname of an advertiser. After viewing the advertisement, the user may like and comment on the advertisement.

Figure 12:
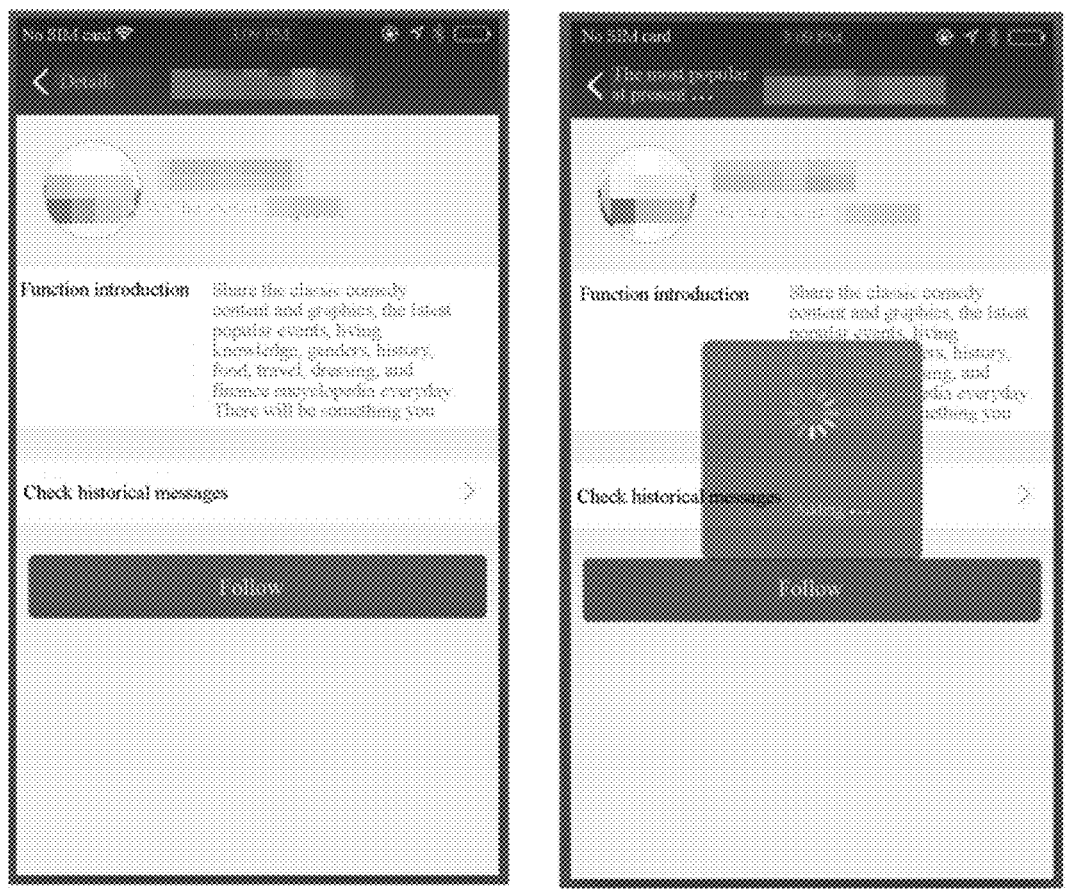
Figure 13:
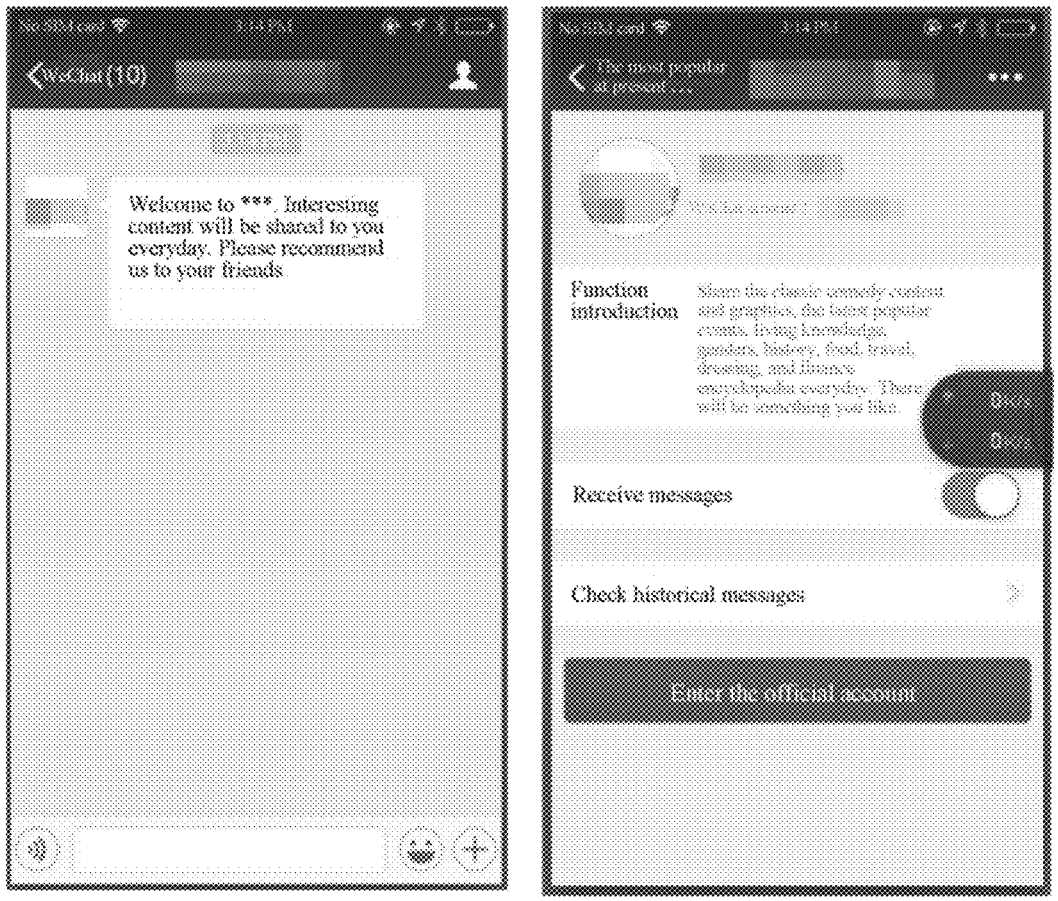

2. For setting of the avatar and nickname of the advertiser displayed in the moments, the advertiser pushing advertisements in the moments needs to open an official account, the official account needs to be verified (Microblog verification is not acceptable, and the verification shall be official account verification), and after the avatar and name of the advertiser in the picture are clicked, register information of the official account is directly pulled. As shown in FIG. 12, the avatar and the nickname are clickable, and after clicking the avatar or the nickname, the user enters a profile page of the official account. A button on the page is "follow" or "Enter the official account" according to whether the user already follows the official account. When clicking the button "Follow", a process is the same as an existing process of following an official account. Using an example in which a system supported by the terminal is Android system, a toast layer of "adding" is displayed. As shown in FIG. 13, if the user successfully follows the official account, the user may directly enter the interface of the official account of the advertiser. If the user already follows the official account, the user directly clicks the button "Enter the official account". Further, it may be set that no response is needed when a long press is performed on the avatar and the nickname.

3. For the button "Check the details", a link of "Check the details" is provided under the picture and text of the advertisement. The three words may be set un-editable. A switch may be disposed at the pushing end, and "Check the details" is used as an option. There is no response after a long press is performed on "Check the details". If the picture and text of the advertisement is too long, and exceeds six lines, "Check the details" may be retracted to the "Full text". After the clicking, the user enters the promotion page. If it is an external link, an embedded browser of the WeChat is invoked by means of the button " . . . " at the upper right corner. A switch of whether to support forwarding may be set, and is controlled by a pushing end. If the pushing end chooses to disable the switch, there is no button " . . . " at the upper right corner, and if the pushing end chooses to enable the switch, the button " . . . " appears at the upper right corner. After the user clicks the button " . . . ", a menu appears, and a form is consistent with that in the existing system.

4. For a picture that can be displayed in an image-text advertisement, one to nine pictures are supported. The operator side may encourage a form including three, four, or six pictures. Experience of clicking the pictures is the same as that of the ordinary feeds. After the user clicks the picture, the user may view a larger picture. Left-right flicking to view more pictures is supported. When the user long presses the picture, an operation of collection may be provided. After the user clicks the picture and views the larger picture, if the user long presses the picture, three options: "Send to friends", "Save into the phone", and "Collect" may pop up.

Figure 14:
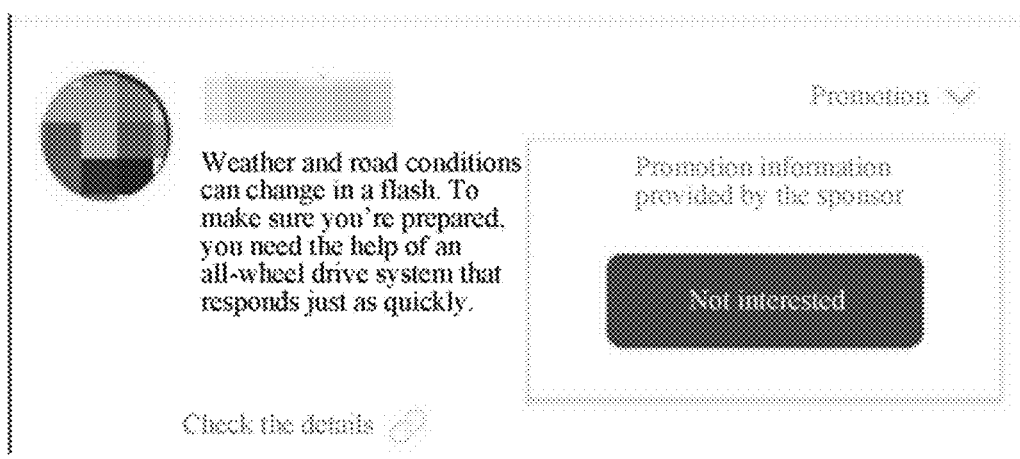

5. For the icon "Promotion", the icon is clickable. If it is an English system, Sponsored may be displayed, and a length of a background color may adapt to a length of a text. After a button at the right of the icon "Promotion" is clicked, a pull-down layer shown in FIG. 14 may appear, and content on the layer is "Not interested". For animation, refer to a plus animation at the upper right corner of a session page.

For a response policy after the button "Not interested" is clicked, the entire advertisement disappears, and animation displayed when the advertisement disappears is the same as that of deleting the moments. If there just is a new message prompt in the moments, if the user clicks the button "Not interested" now, the advertisement disappears, but related message prompt is still there. After the user enters the message list page and clicks the message prompt, there is no response. If the user already clicks "Not interested" for an advertisement, the user enters the "message list" via the personal page of the moments, the user expects that message prompt related to the advertisement is deleted.

Application Scenario 3

The policy for pushing an advertisement according to a preset policy in application scenario 1 is described as follows, and is divided into the following several parts.

First, for related background pushing logic configured on the server in the preset policy, 1) when a user clicks "Not interested", no matter whether there are likes or comments for the advertisement, the advertisement disappears; 2) logic for viewing a message prompt after the advertisement disappears is similar to a disappearance processing mechanism in the local; if a message is prompted on a floating layer in the feeds, after the prompt is clicked, no item of the message can be clicked and it is controlled by the server; if the user enters a message prompt list via a personal page, the terminal may be responsible for executing the disappearance processing mechanism; 3) after the user clicks "Not interested", the same advertisement shall not be pushed to the user again; 4) advertisement content of a same advertiser may not be pushed to the user within two weeks; 5) a weight at which the user views an advertisement of this industry is decreased, and an increase or a decrease of the weight may be recorded by means of an operator; 6) if the user clicks "Not interested" for an advertisement of an advertiser twice, advertisements of the advertiser may not be pushed to the user subsequently; 7) if the user clicks "Not interested" for an advertisement of an industry twice, after the second click, advertisements of this industry may not be pushed to the user within one month.

Second, for how to filter a first round of users for preferential pushing in the preset policy, a seed user is selected. An advertisement may be pushed to a social node user (seed user) at the beginning. Two types of users conform to definition of the seed user: A. active user: logging into the WeChat more than eight times every day, sending more than 50 messages every day, and having more than 500 friends; B. opinion leader: each message in the moments receiving more than 30 likes, and giving more than 10 likes on average every day. These people are pre-defined as seed users, and the server may preferentially push advertisements to these users.

Third, for sequenced display of social shuffling that is performed, in the friend circle based on the relationship link, on advertisements displayed on the user interface of the terminal in the preset policy, a major feature of advertisements in the friend circle is social propagation. After a user makes interaction for the advertisement, when a friend of the user subsequently views the advertisement attached with interaction, the advertisement may have greater effect on the friend. Therefore, for the policy, if user A views an advertisement X, and likes or comments on the advertisement, a probability of viewing, by a friend of user A, the advertisement X subsequently is increased, and the advertisement A is more easily displayed to the friend of user A when competing with other advertisements. If user B enters the moments, and there are multiple advertisements that friends of user B like or comment on, a weight at which an advertisement having a largest quantity of likes and comments is displayed to user B is the largest.

Based on a design principle of sequenced display of social shuffling, the following mechanism may be used for implementation.

Social shuffling: When a user enters the moments, if an appearance condition of an advertisement is reached, assuming that there are three advertisements, and all three advertisements satisfy an orientation of user A, which advertisement is pushed to the user A is determined according to the following rules (assuming that the orientations are consistent): exposure weight=(a quantity of likes given by friends of the user to each advertisement*0.5+a quantity of the first comments given by the friends to the advertisement*0.35+a total like rate of the advertisement (a total quantity of likes/a total quantity of exposure people)*0.15)*a correction factor R. The correction factor R is defined as: If the friends give more than 50 comments to the advertisement, because there are too many likes and comments, and the exposure rate of the advertisement is too high, an appearance probability is decreased, and R=0.5. At another moment, R=1.

Fourth, for other logic in the preset policy, 1) for example, for an appearance opportunity of an advertisement, to limit a quantity of times of exposures of advertisements to a same user, it is set: When the user visits the moments, only when there are four or more than four pieces of new content, one advertisement is pushed; one advertisement is pushed to a user every 48 hours; a time interval may be adjusted flexibly; 2) for example, for an appearance position of an advertisement, when four or more than four pieces of new content are generated, an advertisement may appear in a position following the fourth content (content pushed by the user is not counted); once the advertisement is generated, the advertisement may not be always in the position of the fifth content; as new messages emerge, the advertisement gradually sinks (for example, there are five pieces of content at the beginning, and then, some friends push five pieces of content in the moments, and in this case, the advertisement is displayed in a position of the tenth content); 3) for example, for a disappearance policy, when a user views an advertisement, if the user likes or comments on the advertisement, the advertisement may stay in the moments of the user; if the user gives no like or comment to the advertisement within six hours, the advertisement may disappear from the moments of the user sixth hours after the user views the advertisement for the first time.

Application Scenario 4

The WeChat moments is a social application on which a user shares pictures, text, videos, and the like with friends.

Figure 16:
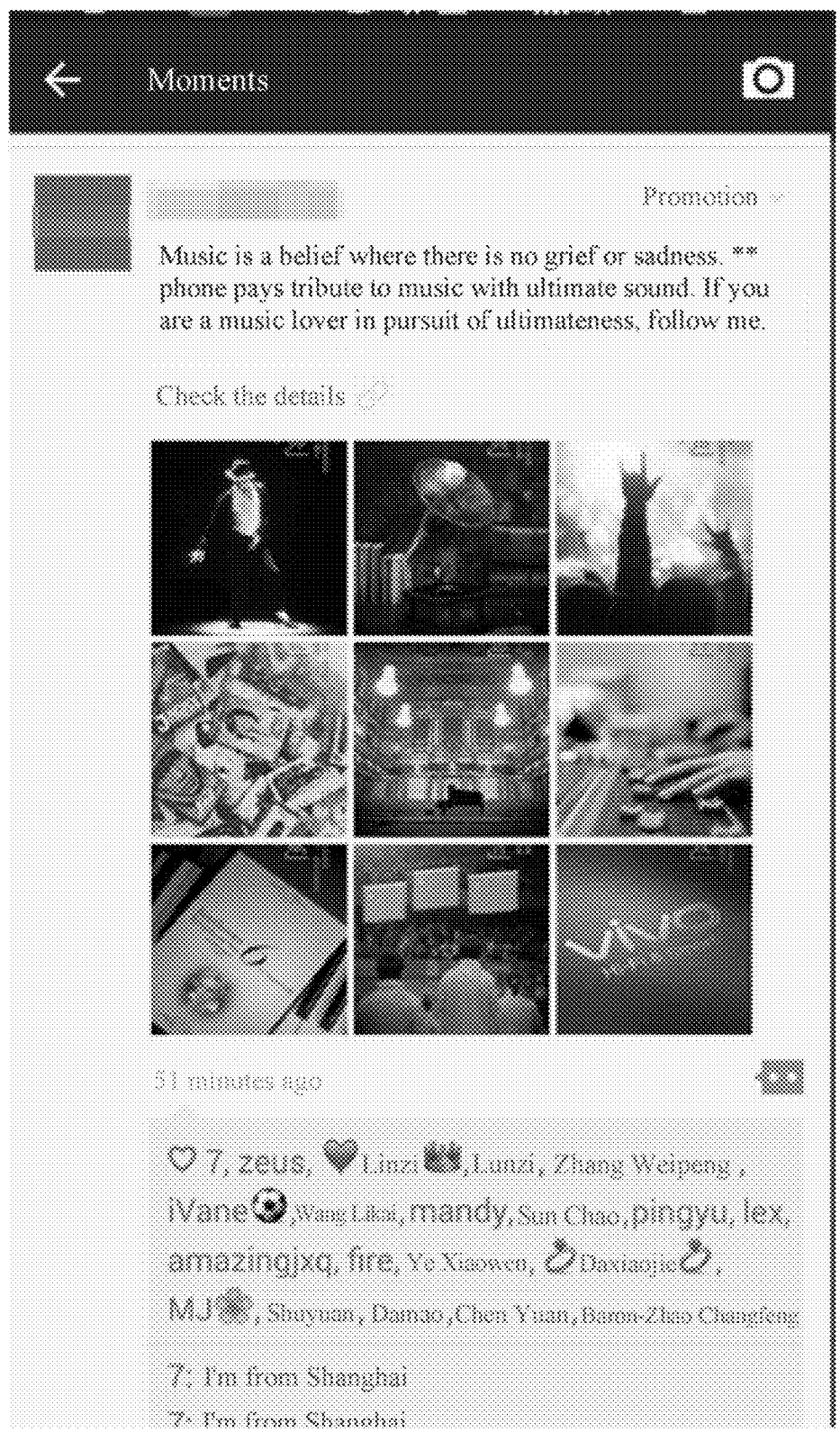

Friends may interact with each other by giving likes or comments. Advertisement in the moments combines the social attribute of the WeChat moments and data accumulation of WeChat. Advertisement content that a user may be interested in is recommended to the user, and content receiving more likes and comments from friends of a user is recommended to the user according to the friend relationship of the user. A product form of the feeds advertisement in the moments is similar to that of original feeds of the user, and is consistent with a style of the WeChat moments. As shown in FIG. 16, an official account is an advertiser. As can be seen from an advertisement of VIVO in FIG. 16, a sender of the advertisement is an official account of VIVO. When the user sends a message in the moments, friends are the main body of the content, and correspondingly, a main body of an advertisement is an official account of the advertiser.

As shown in FIG. 16, the interaction information is externally displayed. For example, the interaction information is likes and comments of the friends of the user. 1). As can be seen from the advertisement instance of VIVO in the figure, when user A pulls the advertisement, comments and likes of friends are displayed. Content of the comments and likes are not retracted, and are directly displayed, so that the user views information about previous interaction of the friends of the user for the advertisement; 2) interaction between the user and the advertisement affects a propagation path of the advertisement; when the user refreshes the moments, the terminal may send a request to the server, to ask whether the server needs to deliver an advertisement; and the server determines, according to historical data of the user, whether to deliver the advertisement.

For content of part 2), the server determines, according to the historical data of the user, whether to deliver the advertisement. The basis for the determining includes any one of or a combination of the following:

Manner 1: Whether the user has viewed the advertisement within 48 hours, and if the user has viewed the advertisement, the server does not deliver the advertisement.

Manner 2: Whether there are four or more feeds during this pulling, new feeds refer to original or shared content of friends, and do not include content sent by the user.

Manner 3: Whether determining to deliver the advertisement, the server needs to determine which advertisement in an advertisement pool is sent to the user. When prices and orientations are the same, which advertisement is pushed to the user is determined according to scores. A method for calculating the scores is: exposure weight=(a quantity of likes given by friends of the user to each advertisement*0.5+a quantity of the first comments given by the friends to the advertisement*0.35+a total like rate of the advertisement (a total quantity of likes/a total quantity of exposure people)*0.15)*a correction factor R. If the friends of the user give more than 50 comments to the advertisement, because there are too many likes and comments, and the exposure rate of the advertisement is too high, an appearance probability is decreased, and R=0.5. At another moment, R=1.

Figure 18:
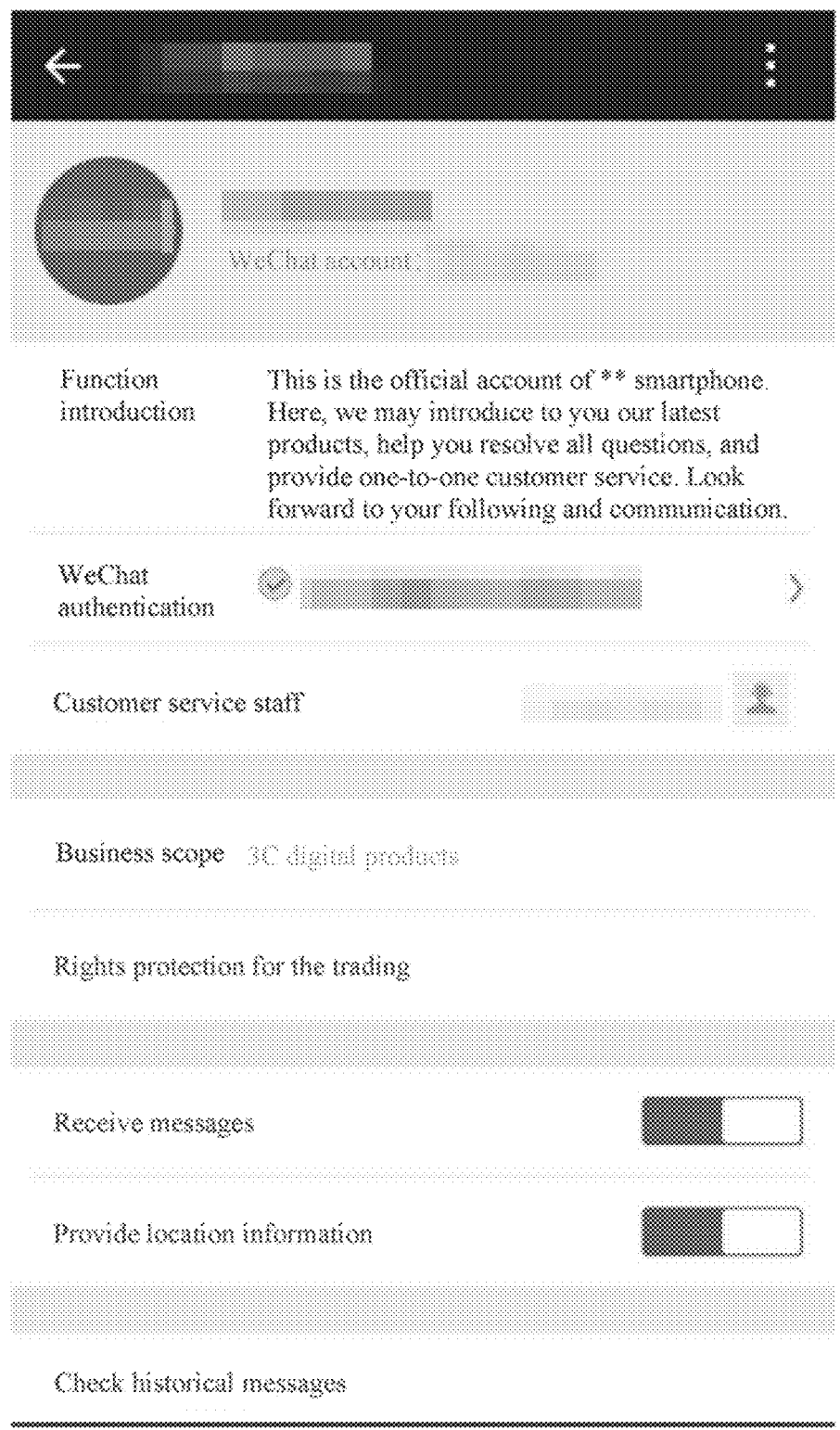

After the user clicks the avatar and the nickname of the official account of the advertiser, the user may enter the profile page of the official account. As shown in FIG. 18, the user may follow the account and view the historical messages on the profile page of the official account. A basic form of the advertisement is text, picture, video, recording file, or the like. The format of the advertisement is consistent with that of the original message of the user, and supports a form of text plus picture, or video. An advantage of the design format is: experience of feeds in the moments continues, and the user may be more easily accept the advertisement, and the form of picture plus text and the form of video may transmit valuable information to the maximum. After clicking each picture, the user may view the larger picture on the browser interface, and may view more pictures by means of left-right flicking. One to nine pictures may be sent, and each picture is clickable.

Interaction for the advertisement based on the friend link in the moments includes comments and/or likes. As shown in FIG. 16, the user may like and comment on the advertisement in the moments, and content of the like and comment are private, and can be viewed only by one-dimensional friends of the user. Those who are not friends of the user cannot view interaction of the user for the advertisement. The advertiser may view the likes, comments, and mutual replies between users on the background. A privacy policy is consistent with that of the original feeds in the moments.

Figure 17:
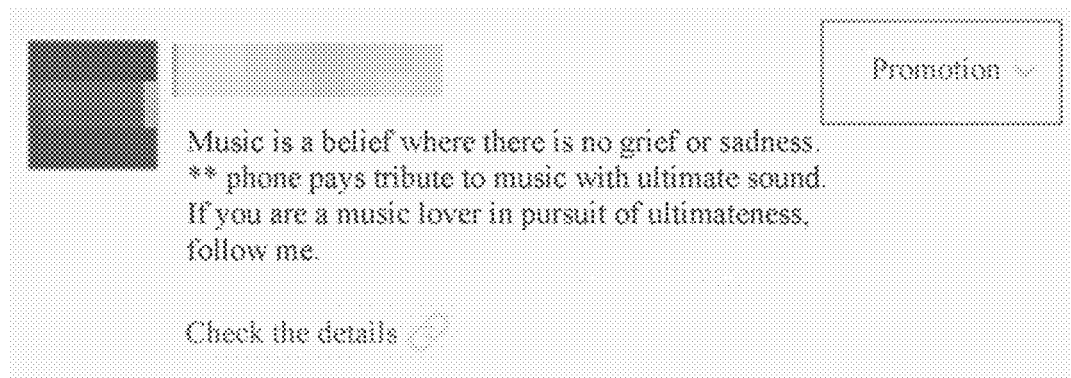

When user A likes and comments on an advertisement, a connection may be established between the user and the advertisement by means of the interaction mechanism. Subsequently, if a friend of user A likes and comments on the advertisement, user A may receive a message prompt, and after clicking the message prompt, the user may reply to the message on a message detail page, or the user clicks "Check the details", as shown in FIG. 17, to enter a profile page of the official account, as shown in FIG. 18. An icon "promotion" may be clicked, and a floating layer may appear. The floating layer indicates that the information is an advertisement. The user may click "Not interested" to shield the advertisement, and after the user clicks "Not interested", the advertisement may disappear, and the advertisement may not be displayed to the same user subsequently. Meanwhile, a probability of displaying an advertisement of the advertiser to the user is decreased. After the advertisements of the advertiser are displayed to the user continuously for three times, the advertisement of the advertiser may not be displayed to the user again.

It should be noted that, advertisements in the moments support jumping to a link. A difference between the advertisements and the original feeds of ordinary users in the moments is: supporting jumping to an external link. The advertiser may design a promotion page in advance, and configures the promotion page into the advertisement. When the user clicks "Check the details", the user may enter a corresponding page to learn content that the advertiser wants to transmit.

When the integrated module in this embodiment of the present invention is implemented in the form of a software functional module and sold or used as an independent product, the integrated module may be stored in a computer-readable storage medium. Based on such understanding, a person skilled in the art should understand that the embodiments of the present invention may be provided as a method, a system, or a computer program product. Therefore, the present disclosure may take the form of total hardware embodiments, total software embodiments, or embodiments combining software and hardware. In addition, the present disclosure may take the form of a computer program product implemented on one or more computer-usable storage media including computer-usable program code, and the storage medium includes, but not limited to, a USB flash drive, a removable hard disk, a read-only memory (ROM), a magnetic storage device, a CD-ROM, and an optical storage device.

The present disclosure is described with reference to the flowcharts and/or block diagrams of the method, the device (system), and the computer program product according to the embodiments of the present invention. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although preferable embodiments of the present invention have been described, once a person skilled in the art knows a basic creative concept, they can make other changes and modifications to these embodiments. Therefore, the following claims are intended to be construed as to cover the exemplary embodiments and all changes and modifications falling within the scope of the present disclosure.

An embodiment of the present invention further provides a computer storage medium, storing a computer executable instruction, and the computer executable instruction being used for executing the information processing method.

INDUSTRIAL APPLICABILITY

By using the embodiments of the present invention, feedback on information shared in the social group is relatively critical, and the social group is different from an open public environment in which feedback may be made freely without restriction. Therefore, 1) in one aspect, subsequent feedback information is provided to the server and is used as a parameter control factor for correcting a policy, to obtain second multi-media information, and the second multi-media information is more accurately pushed to a terminal due to sufficiently accurate feedback information analysis; 2) in another aspect, information shared in the social group is based on the moments, for example, friends may follow similar types of valuable information. Therefore, propagated second multi-media information formed based on interaction of at least one second user account in the social group for the second multi-media information may gain more attention and reliability from the user. In addition, the second multi-media information is displayed directly on a user interface of the terminal in an external display manner, so that the first user account can directly view information about previous interaction of the at least one second user account for the second multi-media information, and the user can obtain the interaction information in time, to learn in time whether the second multi-media information is valuable. Therefore, a probability and an opportunity of obtaining, by the user, valuable information are increased, and the problems in the existing technology are resolved. In addition, the second multi-media information is different from first multi-media information shared by any user in the social group, the second multi-media information is specified information that conforms to the preset policy on the server side and that is pushed, and the second multi-media information and the first multi-media information are displayed in a same mode. In this case, a uniform user interface style may be formed, and no interference is caused to function use and display habits of the user.

What is claimed is:

1. An information processing method performed at a terminal having one or more processors and memory for storing programs to be executed by the one or more processors, wherein the terminal is communicatively connected to a remote server, the method comprising:
   logging into a first user account of a social networking application;
   retrieving, by the terminal from the remote server, information associated with multiple user accounts of the social networking application that are direct contacts of the first user account at the social application, the multiple user accounts including a second user account of the social networking application;
   receiving, at the terminal, first multi-media information selected by the remote server, wherein the first multi-media information is published by the second user account of the social networking application and the first multi-media information is accessible by the first user account;
   receiving, at the terminal, second multi-media information selected by the remote server, wherein:
      the second multi-media information is published by an official account of the social networking application that is followed by the multiple user accounts including the second user account but not followed by the first user account and therefore the second multi-media information is not previously presented to the first user account;
      the second multi-media information is selected by the remote server in accordance with a determination that the second multi-media information is interacted by at least two of the multiple user accounts, the at least two of the multiple user accounts including the second user account of the social networking application; and
      the second multi-media information satisfies preset policies of the remote server, the preset policies based, at least in part, on an appearance probability determined by interactions by the at least two of the multiple user accounts, the interactions including likes and comments on the second multi-media information by the at least two of the multiple user accounts;
   displaying, on the terminal to the first user account, the first multi-media information and the second multi-media information in a same manner, further including displaying information of the interactions by the at least two of the multiple user accounts along with the second multi-media information;

receiving, at the terminal, a user interaction with the second multi-media information by the first user account; and transmitting, by the terminal to the remote server, the user interaction associated with the second multi-media information to be combined with the interaction information of the at least two of the multiple user accounts by the remote server.

2. The method according to claim 1, wherein the first multi-media information is displayed next to identity information of the second user account of the social networking application and the second multi-media information is displayed next to identity information of the official account of the social networking application that is not followed by first user account.

3. The method according to claim 1, wherein the information of the interactions by the at least two of the multiple user accounts include identity information of the second user account that has commented on the second multi-media information from its corresponding user account and first feedback information by the second user account.

4. The method according to claim 3, wherein the first feedback information by the second user account is directly displayed without further user operation on the terminal.

5. The method according to claim 3, further comprising:
receiving, from the first user account, second feedback information on the second multi-media information; and
returning the second feedback information to the remote server, wherein the first feedback information and the second feedback information are analyzed by the remote server in accordance with the preset policies before pushing the second multi-media information to another terminal.

6. The method according to claim 1, wherein the second multi-media information is displayed on the terminal in at least one form of text, picture, video, and audio, and the method further comprising:
displaying a first interaction object associated with the second multi-media information for receiving a first user operation on the first interaction object;
in response to the first user operation, displaying prompt information for prompting the first user account whether to continue to receive information content of the second multi-media information; and
in response to a second user operation on the prompt information, obtaining feedback information for the prompt information and reporting the feedback information to the remote server.

7. The method according to claim 1, further comprising:
selecting, by the first user account, the second multi-media information from the remote server when a trigger opportunity of actively pulling, by the first user account, the second multi-media information from the remote server is greater than or equal to a first threshold.

8. The method according to claim 1, further comprising:
selecting, by the first user account, the second multi-media information from the remote server when a trigger opportunity of periodically pulling, by the first user account, the second multi-media information from the remote server is greater than or equal to a second threshold.

9. The method according to claim 1, further comprising:
selecting, by the first user account, the second multi-media information from the remote server when a trigger opportunity defined by an appearance position of the second multi-media information in information feeds associated with the first user account is greater than or equal to a third threshold.

10. The method according to claim 1, further comprising:
selecting, by the first user account, the second multi-media information from the remote server when a trigger opportunity defined by feedback information of the second multi-media information by any of the multiple user accounts is greater than or equal to a fourth threshold.

11. A terminal having one or more processors and memory storing programs to be executed by the one or more processors, wherein the terminal is communicatively connected to a remote server, and the programs, when executed by the one or more processors, cause the terminal to perform a plurality of operations including:
logging into a first user account of a social networking application;
retrieving, by the terminal from the remote server, information associated with multiple user accounts of the social networking application that are direct contacts of the first user account at the social application, the multiple user accounts including a second user account of the social networking application;
receiving, at the terminal, first multi-media information selected by the remote server, wherein the first multi-media information is published by the second user account of the social networking application and the first multi-media information is accessible by the first user account;
receiving, at the terminal, second multi-media information selected by the remote server, wherein:
the second multi-media information is published by an official account of the social networking application that is followed by the multiple user accounts including the second user account but not followed by the first user account and therefore the second multi-media information is not previously presented to the first user account;
the second multi-media information is selected by the remote server in accordance with a determination that the second multi-media information is interacted by at least two of the multiple user accounts, the at least two of the multiple user accounts including the second user account of the social networking application; and
the second multi-media information satisfies preset policies of the remote server, the preset policies based, at least in part, on an appearance probability determined by interactions by the at least two of the multiple user accounts, the interactions including likes and comments on the second multi-media information by the at least two of the multiple user accounts;
displaying, on the terminal to the first user account, the first multi-media information and the second multi-media information in a same manner, further including displaying information of the interactions by the at least two of the multiple user accounts along with the second multi-media information;
receiving, at the terminal, a user interaction with the second multi-media information by the first user account; and
transmitting, by the terminal to the remote server, the user interaction associated with the second multi-media information to be combined with the interaction information of the at least two of the multiple user accounts by the remote server.

12. The terminal according to claim 11, wherein the first multi-media information is displayed next to identity information of the second user account of the social networking application and the second multi-media information is displayed next to identity information of the official account of the social networking application that is not followed by first user account.

13. The terminal according to claim 11, wherein the information of the interactions by the at least two of the multiple user accounts include identity information of the second user account that has commented on the second multi-media information from its corresponding user account and first feedback information by the second user account.

14. The terminal according to claim 13, wherein the first feedback information by the second user account is directly displayed without further user operation on the terminal.

15. The terminal according to claim 11, wherein the second multi-media information is displayed on the terminal in at least one form of text, picture, video, and audio, and the plurality of operations further comprise:
displaying a first interaction object associated with the second multi-media information for receiving a first user operation on the first interaction object;
in response to the first user operation, displaying prompt information for prompting the first user account whether to continue to receive information content of the second multi-media information; and
in response to a second user operation on the prompt information, obtaining feedback information for the prompt information and reporting the feedback information to the remote server.

16. The terminal according to claim 11, wherein the second multi-media information is selected when at least one of the following conditions is met:
when a trigger opportunity of actively pulling, by the first user account, the second multi-media information from the remote server is greater than or equal to a first threshold;
when a trigger opportunity of periodically pulling, by the first user account, the second multi-media information from the remote server is greater than or equal to a second threshold;
when a trigger opportunity defined by an appearance position of the second multi-media information in information feeds associated with the first user account is greater than or equal to a third threshold; and
when a trigger opportunity defined by feedback information of the second multi-media information by any of the multiple user accounts is greater than or equal to a fourth threshold.

17. A non-transitory computer readable storage medium storing a plurality of computer executable instructions, the computer executable instructions being used by a terminal for executing an information processing method, wherein the terminal is communicatively connected to a remote server, the computer executable instructions further including:
logging into a first user account of a social networking application;
retrieving, by the terminal from the remote server, information associated with multiple user accounts of the social networking application that are direct contacts of the first user account at the social application, the multiple user accounts including a second user account of the social networking application;
receiving, at the terminal, first multi-media information selected by the remote server, wherein the first multi-media information is published by the second user account of the social networking application and the first multi-media information is accessible by the first user account;
receiving, at the terminal, second multi-media information selected by the remote server, wherein:
the second multi-media information is published by an official account of the social networking application that is followed by the multiple user accounts including the second user account but not followed by the first user account and therefore the second multi-media information is not previously presented to the first user account;
the second multi-media information is selected by the remote server in accordance with a determination that the second multi-media information is interacted by at least two of the multiple user accounts, the at least two of the multiple user accounts including the second user account of the social networking application; and
the second multi-media information satisfies preset policies of the remote server, the preset policies based, at least in part, on an appearance probability determined by interactions by the at least two of the multiple user accounts, the interactions including likes and comments on the second multi-media information by the at least two of the multiple user accounts;
displaying, on the terminal to the first user account, the first multi-media information and the second multi-media information in a same manner, further including displaying information of the interactions by the at least two of the multiple user accounts along with the second multi-media information;
receiving, at the terminal, a user interaction with the second multi-media information by the first user account; and
transmitting, by the terminal to the remote server, the user interaction associated with the second multi-media information to be combined with the interaction information of the at least two of the multiple user accounts by the remote server.

18. The non-transitory computer readable storage medium according to claim 17, wherein the first multi-media information is displayed next to identity information of the second user account of the social networking application and the second multi-media information is displayed next to identity information of the official account of the social networking application that is not followed by first user account.

19. The non-transitory computer readable storage medium according to claim 17, wherein the information of the interactions by the at least two of the multiple user accounts include identity information of the second user account that has commented on the second multi-media information from its corresponding user account and first feedback information by the second user account.

20. The non-transitory computer readable storage medium according to claim 19, wherein the first feedback information by the second user account is directly displayed without further user operation on the terminal.

* * * * *